(12) United States Patent
Kanno et al.

(10) Patent No.: US 10,894,904 B2
(45) Date of Patent: Jan. 19, 2021

(54) PRESSURE-SENSITIVE ADHESIVE SHEET AND PRESSURE SENSITIVE ADHESIVE COMPOSITION

(71) Applicant: NITTO DENKO CORPORATION, Ibaraki (JP)

(72) Inventors: Ryo Kanno, Ibaraki (JP); Kiyoe Shigetomi, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 39 days.

(21) Appl. No.: 16/291,545

(22) Filed: Mar. 4, 2019

(65) Prior Publication Data

US 2019/0194499 A1  Jun. 27, 2019

Related U.S. Application Data

(63) Continuation-in-part of application No. 14/882,748, filed on Oct. 14, 2015, now Pat. No. 10,385,241, which is a continuation of application No. PCT/JP2014/001686, filed on Mar. 25, 2014.

(30) Foreign Application Priority Data

Apr. 15, 2013 (JP) ................................ 2013-085176
Jan. 14, 2014 (JP) ................................ 2014-004279

(51) Int. Cl.
C09J 7/00 (2018.01)
C09J 7/38 (2018.01)
C09J 133/04 (2006.01)

(52) U.S. Cl.
CPC ............ *C09J 7/385* (2018.01); *C09J 133/04* (2013.01); *C09J 2203/318* (2013.01); *C09J 2203/326* (2013.01); *C09J 2301/414* (2020.08); *C09J 2433/00* (2013.01); *C09J 2483/00* (2013.01)

(58) Field of Classification Search
None
See application file for complete search history.

(56) References Cited

U.S. PATENT DOCUMENTS

| | | | | |
|---|---|---|---|---|
| 4,693,935 A * | 9/1987 | Mazurek | ............... | C09J 155/005 428/352 |
| 5,252,395 A | 10/1993 | Maruoka et al. | | |
| 5,308,887 A * | 5/1994 | Ko | ............... | C09J 4/00 428/446 |
| 5,716,685 A * | 2/1998 | Kumar | ............... | B32B 7/12 428/40.1 |
| 9,359,531 B2 * | 6/2016 | Sherman | ............... | C09J 133/02 |
| 2007/0213463 A1 * | 9/2007 | Sherman | ............... | C09J 7/22 525/100 |
| 2009/0220800 A1 | 9/2009 | Yokochi | | |
| 2010/0101723 A1 | 4/2010 | Okamoto et al. | | |
| 2011/0311810 A1 | 12/2011 | Yamagata et al. | | |
| 2012/0095159 A1 | 4/2012 | Liu et al. | | |
| 2012/0108560 A1 | 5/2012 | Evans et al. | | |
| 2012/0114737 A1 | 5/2012 | Loubert et al. | | |
| 2013/0004769 A1 * | 1/2013 | Okamoto | ............... | C09J 7/385 428/355 CN |
| 2013/0005910 A1 * | 1/2013 | Okamoto | ............... | C09J 7/385 525/205 |
| 2013/0005911 A1 * | 1/2013 | Okamoto | ............... | C09J 133/08 525/210 |
| 2013/0011658 A1 * | 1/2013 | Okamoto | ............... | B32B 27/08 428/317.3 |
| 2013/0012653 A1 | 1/2013 | Liu | | |
| 2013/0084416 A1 | 4/2013 | Nakanishi et al. | | |
| 2013/0177758 A1 * | 7/2013 | Shigetomi | ............... | C08L 57/02 428/317.9 |
| 2014/0037951 A1 * | 2/2014 | Shigetomi | ............... | C08F 220/18 428/355 AC |
| 2014/0356777 A1 | 12/2014 | Tani et al. | | |
| 2016/0096982 A1 | 4/2016 | Fornof et al. | | |

FOREIGN PATENT DOCUMENTS

| | | |
|---|---|---|
| CN | 101652447 A | 2/2010 |
| EP | 2 141 210 A1 | 1/2010 |
| JP | 63-291969 A | 11/1988 |
| JP | 63-291971 A | 11/1988 |

(Continued)

OTHER PUBLICATIONS

International Search Report for PCT/JP2014/001686 dated Jul. 1, 2014.
Decision of Rejection dated Sep. 5, 2018, issued by the State Intellectual Property Office of the P.R.C. in corresponding Chinese Application No. 201480021294.4.
Extended European Search Report dated Oct. 25, 2016, from the European Patent Office in counterpart European application No. 14785124.0.

(Continued)

*Primary Examiner* — Robert S Loewe
(74) *Attorney, Agent, or Firm* — Sughrue Mion, PLLC

(57) ABSTRACT

Provided is a pressure-sensitive adhesive composition including: an acrylic polymer (A) having a glass transition temperature lower than 0 C.°; and a polymer (B) containing, as monomer units, both a monomer (B1) having a polyorganosiloxane skeleton and a monomer (B2) whose homopolymer has a glass transition temperature of 40 C.° or higher. The acrylic polymer (A) contains, as a monomer unit, at least one monomer selected from the group consisting of N-vinyl cyclic amides represented by the following general formula (M1):

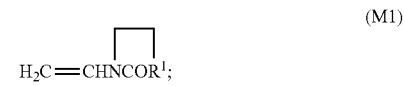

(M1)

wherein $R^1$ is a divalent organic group.

10 Claims, No Drawings

(56) References Cited

FOREIGN PATENT DOCUMENTS

| | | |
|---|---|---|
| JP | 63-291972 A | 11/1988 |
| JP | 1-256580 A | 10/1989 |
| JP | 2-123182 A | 5/1990 |
| JP | 3-006277 A | 1/1991 |
| JP | 11-302610 A | 11/1999 |
| JP | 11-302614 A | 11/1999 |
| JP | 2008-285657 A | 11/2008 |
| JP | 2009-067824 | 4/2009 |
| JP | 2010-163518 A | 7/2010 |
| JP | 2011-127054 A | 6/2011 |
| JP | 2011-184603 A | 9/2011 |
| KR | 10-2011-0137296 | 12/2011 |
| KR | 1020130036159 A | 4/2013 |

OTHER PUBLICATIONS

Notification of Reasons for Refusal dated Jan. 17, 2017, issued from the Japan Patent Office in corresponding Japanese Application No. 2014-004279.
Notice of Preliminary Rejection dated Feb. 23, 2018 from the Korean Intellectual Property Office in counterpart Korean application No. 10-2015-7029913.
Notification of Reasons for Refusal dated Apr. 26, 2018 from the Japanese Patent Office in counterpart Japanese application No. 2017-126531.
Decision of Refusal dated Apr. 4, 2017, issued from the Japan Patent Office in corresponding Japanese Application No. 2014-004279.
Notification of Submission of Opinion dated Sep. 21, 2018, issued by the Korean Intellectual Property Office in corresponding Korean Application No. 10-2018-7023688.
Office Action dated Feb. 22, 2017 issued by the Intellectual Property Office of Taiwan in counterpart application No. 103111852.
Notification of First Office Action dated Dec. 22, 2016 from the State Intellectual Property Office of People's Republic of China for corresponding Application No. 201480021294.4.
Notification of Second Office Action dated Sep. 5, 2017 from the State Intellectual Property Office of People's Republic of China for corresponding Application No. 201480021294.4.
Archived English language translation of JP 02123182, 17 pages, translation generated Mar. 2012.
Request for Rescission of Patent Registration dated Dec. 26, 2018, in KR 10-2015-7029913 (Patent No. 10-1891873).
Technical data sheet for X-22-2426, 1 page, 2016.
Technical data sheet from Shin Etsu, 4 pages 2017.
Thermal analysis data for some polymers, 2 pages, date unknown.
Notification of Reason for Refusal dated Jun. 19, 2020, from the Korean Intellectual Property Office in application No. 10-2019-7012018.

* cited by examiner

PRESSURE-SENSITIVE ADHESIVE SHEET AND PRESSURE SENSITIVE ADHESIVE COMPOSITION

CROSS-REFERENCE TO RELATED APPLICATIONS

This application is a Continuation-in-part application of U.S. application Ser. No. 14/882,748 filed on Oct. 14, 2015, which claims the benefit of priority from the prior Japanese Patent Application No. 2013-085176, filed on Apr. 15, 2013, Japanese Patent Application No. 2014-004279, filed on Jan. 14, 2014, and International Patent Application No. PCT/JP 2014/001686, filed on Mar. 25, 2014, the entire content of each of which is incorporated herein by reference.

BACKGROUND OF THE INVENTION

1. Field of the Invention

The present invention relates to a pressure-sensitive adhesive composition, and a pressure-sensitive adhesive layer and a pressure-sensitive adhesive sheet that have the pressure-sensitive adhesive composition.

2. Description of the Related Art

A pressure-sensitive adhesive sheet is used for adhering adherends to each other or for fixing an article to an adherend by being firmly adhered to the adherend. In this case, a pressure-sensitive adhesive tape having the following characteristics is required: the pressure-sensitive adhesive force of which, occurring at the beginning of attachment, is small, because it is difficult to reattach the tape if the tape has large pressure-sensitive adhesive force from the beginning of attachment; while the pressure-sensitive adhesive force of which is increased over time such that large pressure-sensitive adhesive force can be obtained, in terms of fixing members in home electrical appliances and mobile devices, etc.

In order to meet such a change in pressure-sensitive adhesive force, methods for changing the pressure-sensitive adhesive force of pressure-sensitive adhesive sheets by heating or ultraviolet irradiation have traditionally been used (see Patent Documents 1 to 3).

A pressure-sensitive adhesive sheet having the following properties is also required: when a pressure-sensitive adhesive sheet is peeled from an adherend, the adherend is hard to be contaminated or there is little adhesive deposit remaining on the adherend.

[Patent Document 1] Japanese Patent Application Publication No. 1999-302610
[Patent Document 2] Japanese Patent Application Publication No. 1999-302614
[Patent Document 3] Japanese Patent Application Publication No. 2011-127054

There has been the problem that the method for changing the pressure-sensitive adhesive force of a pressure-sensitive adhesive sheet by heating or ultraviolet irradiation cannot be applied to an adherend that may be adversely affected by these treatments. There is actually a method for reducing pressure-sensitive adhesive force by temporarily forming a layer having small cohesive force on the interface between a pressure-sensitive adhesive and an adherend with the use of an additive, etc.; in such a method, however, there occurs the problem that, after a pressure-sensitive adhesive sheet is peeled in the state where the pressure-sensitive adhesive force is small, the adherend may be contaminated by adhesive deposit or attached additives, which causes the adherend to be adversely affected or makes it difficult to reuse the adherend. Accordingly, in a traditional pressure-sensitive adhesive, reworkability to various adherends, which is obtained by small pressure-sensitive adhesive force occurring at the beginning of attachment, an increase in adhesiveness occurring over time, and a low contamination property have not been entirely achieved.

SUMMARY OF THE INVENTION

The present invention has been made in view of these problems, and a purpose of the invention is to provide a pressure-sensitive adhesive in which reworkability to an adherend, an improvement in adhesiveness occurring over time, and a low contamination property can be entirely achieved.

An aspect of the present invention is a pressure-sensitive adhesive composition. The pressure-sensitive adhesive composition comprises: a polymer (A) having a glass transition temperature lower than 0 C.°; and a polymer (B) containing, as a monomer unit, a monomer (B1) having a polyorganosiloxane skeleton.

In some embodiments, the polymer (B) may further contain a monomer whose homopolymer has a glass transition temperature of 40 C.° or higher.

In some embodiments, the polymer (A) may contain, as a monomer unit, at least one monomer selected from the group consisting of N-vinyl cyclic amides, typically represented by the following general formula (M1).

(M1)

($R^1$ in the general formula (M1) is a divalent organic group.)

In some embodiments, the monomer (B1) having a polyorganosiloxane skeleton may have a functional group equivalent (Fge) of, for instance, 1000 g/mol≤Fge<15000 g/mol. In some embodiments, the polymer (B) may have a weight average molecular weight (MwB) of, for instance, 10000≤MwB<100000.

In some embodiments, the content of the polymer (B) may be, for instance, 0.1 to 20 parts by mass, relative to 100 parts by mass of the polymer (A).

In the pressure-sensitive adhesive composition of the aforementioned aspect, the polymer (A) may be an acrylic polymer. The polymer (B) may be a polymer containing, as a monomer unit, 10% by mass to 80% by mass of a monomer whose homopolymer has a glass transition temperature of 40° C. or higher.

Additionally, the monomer having a polyorganosiloxane skeleton may be one or more monomers selected from the group consisting of the monomers represented by the following general formula (1) or (2):

[Chemical Formula 1]

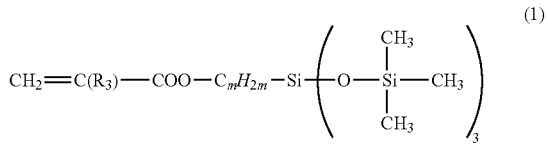

(1)

-continued

[Chemical Formula 2]

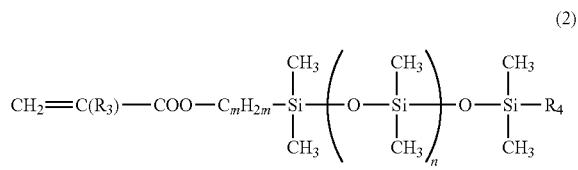

(2)

[wherein, $R_3$ is hydrogen or methyl; $R_4$ is methyl or a monovalent organic group; and each of m and n is an integer of 0 or more.]

Another aspect of the present invention is a pressure-sensitive adhesive layer. The pressure-sensitive adhesive layer is made of the pressure-sensitive adhesive composition according to any one of the aforementioned aspects.

Still another aspect of the present invention is a pressure-sensitive adhesive sheet. The pressure-sensitive adhesive sheet is made by forming a pressure-sensitive adhesive layer of the aforementioned aspect on at least one surface of a supporting body.

Appropriate combinations of the aforementioned respective elements will also be within the scope of the present invention sought to be protected by the patent application.

DETAILED DESCRIPTION OF THE INVENTION

The invention will now be described by reference to the preferred embodiments. This does not intend to limit the scope of the present invention, but to exemplify the invention. Hereinafter, preferred embodiments for carrying out the present invention will be described in detail with reference to the accompanying tables.

A pressure-sensitive adhesive composition according to an embodiment comprises a polymer (A) and a polymer (B).

Hereinafter, each component that forms the pressure-sensitive adhesive composition according to the embodiment will be described in detail.

[Polymer (A)]

The polymer (A) is a polymer having a glass transition temperature lower than 0° C. The polymer (A) is not particularly limited as far as the glass transition temperature of which is lower than 0° C., and various polymers to be generally used as a pressure-sensitive adhesive, such as an acrylic polymer, rubber polymer, silicone polymer, polyurethane polymer, and polyester polymer, can be used. When the polymer (B) is a (meth)acrylic polymer, an acrylic polymer, which is easily compatible with the (meth)acrylic polymer and has high transparency, is preferable.

The glass transition temperature (Tg) of the polymer (A) is advantageously lower than 0 C.°. When the glass transition temperature (Tg) of the polymer (A) is lower than 0 C.°, the pressure-sensitive adhesive containing the polymer (A) tend to exhibit moderate fluidity, and therefore, it is suited for pressure-sensitive adhesive that can exhibit an increase in pressure-sensitive adhesive force occurring over time. The glass transition temperature (Tg) of the polymer (A) is preferably lower than −10 C.°, and more preferably lower than −40 C.° and usually −80 C.° or higher.

The glass transition temperature is a nominal value described in documents or catalogs, etc., or a value calculated based on the following equation (X) (Fox Equation).

$$1/Tg = W_1/Tg_1 + W_2/Tg_2 + \ldots + W_n/Tg_n \quad (X)$$

[wherein, Tg represents the glass transition temperature (unit: K) of the polymer (A); $Tg_i$ (i=1, 2, ... n) represents the glass transition temperature (unit: K), when monomer i forms a homopolymer; and $W_i$ (i=1, 2, ... n) represents the mass fraction of the monomer i based on the total monomer components.] The above equation (X) is adopted when the polymer (A) is formed of n types of monomer components of monomer 1, monomer 2, ..., monomer n.

In the present description, the "glass transition temperature when a homopolymer is formed" means the "glass transition temperature of a homopolymer of the monomer", which means the glass transition temperature (Tg) of a polymer formed only by a monomer (sometimes referred to as a "monomer X") as a monomer component. Specifically, those values are described in "Polymer Handbook" (Third Edition, John Wiley & Sons, Inc, 1989). The glass transition temperatures (Tg) of homopolymers, which are not described in the above document, means the values obtained, for example, by the following measuring method. That is, into a reactor provided with a thermometer, a stirrer, a nitrogen inlet pipe, and a reflux cooling pipe, 100 parts by mass of the monomer X, 0.2 parts by mass of 2,2'-azobi-sisobutyronitrile, and 200 parts by mass of ethyl acetate as a polymerization solvent are placed, and the mixture is stirred for 1 hour while nitrogen gas is being introduced. After the oxygen in the polymerization system is removed in this way, the mixture is heated to 63° C. to react with each other for 10 hours. Subsequently, the mixture is cooled to room temperature to obtain a homopolymer solution having a solid concentration of 33% by mass. Subsequently, this homopolymer solution is caused to flow on a release liner to be coated thereon, and the solution is then dried to make a test sample (sheet-shaped homopolymer) having a thickness of approximately 2 mm. Subsequently, 1 to 2 mg of this test sample is weighed and placed in an aluminum open cell, so that Reversing Heat Flow (specific heat component) behaviors of the homopolymer are obtained by using a temperature-modulated DSC (product name: "Q-2000" made by TA Instruments Inc.) at a heating rate of 5° C./min under 50 ml/min of a nitrogen flow rate atmosphere. With reference to JIS-K-7121, the temperature at the point where a straight line, located at the same distance in the vertical axis direction from a straight line obtained by extending the base line on the low-temperature side of the obtained Reversing Heat Flow and from a straight line obtained by extending the base line on the high-temperature side thereof, and a curved line, located at the portion where the glass transition temperature is changed in a stepwise shape, intersect with each other is determined to be the glass transition temperature (Tg) of the homopolymer.

While no particular limitations are imposed, the weight average molecular weight (MwA) of the polymer (A) can be, for example, approximately $3 \times 10^4$ or higher. The weight average molecular weight (MwA) of the polymer (A) may be suitably about $10 \times 10^4$ or higher and preferably about $20 \times 10^4$ or higher. With the polymer (A) having such a MwA, a pressure-sensitive adhesive having a suitable cohesion is likely to be obtained. From the standpoint of obtaining higher cohesiveness, in some embodiments, the weight average molecular weight (MwA) of the polymer (A) can be, for example, about $30 \times 10^4$ or higher, about $40 \times 10^4$ or higher, about $50 \times 10^4$ or higher, about $60 \times 10^4$ or higher, or even about $80 \times 10^4$ or higher. The weight average molecular weight (MwA) of the polymer (A) is normally suitably about $500 \times 10^4$ or lower. The polymer (A) having such a MwA is suited for obtaining a pressure-sensitive adhesive sheet exhibiting a low pressure-sensitive adhesive force to an adherend at the beginning of attachment and an increase in pressure-sensitive adhesive force occurring over time. The MwA being not excessively high can be advantageous also from the standpoint of improving compatibility with the polymer (B). In some embodiments, the weight average molecular weight (MwA) of the polymer (A) can be, for example, about $250 \times 10^4$ or lower, about $200 \times 10^4$ or lower, or even about $150 \times 10^4$ or lower.

[Acrylic Polymer]

Hereinafter, an acrylic polymer, which is a preferred specific example of the polymer (A), will be described in detail.

As used herein, the term "acrylic polymer" refers to a polymer having a monomeric unit derived from a (meth)acrylic monomer in the polymer structure and typically refers to a polymer containing over 50% by mass monomeric units derived from a (meth)acrylic monomer. The term "(meth)acrylic monomer" refers to a monomer having at least one (meth)acryloyl group in one molecule. In this context, it is intended that the term "(meth)acryloyl group" collectively refers to an acryloyl group and a methacryloyl group. Therefore, the concept of "(meth)acrylic monomer" as used herein may encompass both a monomer (acrylic monomer) having an acryloyl group and a monomer (methacrylic monomer) having a methacryloyl group. Similarly, it is intended that the term "(meth)acrylic acid" as used herein collectively refers to acrylic acid and methacrylic acid and the term "(meth)acrylate" collectively refers to an acrylate and a methacrylate.

The acrylic polymer can be, for instance, a polymer containing, as a monomer unit, a (meth)acrylic acid alkyl ester having a $C_{1-20}$ linear or branched alkyl group in an amount of 50% by mass or more. Solely one species or a combination of two or more species of the (meth)acrylic acid alkyl ester having a $C_{1-20}$ alkyl group may be used to form the acrylic polymer. A method of obtaining the acrylic polymer is not particularly limited, but the polymer can be obtained by applying various polymerization methods that are generally used as a method of synthesizing an acrylic polymer, such as solution polymerization, emulsion polymerization, block polymerization, suspension polymerization, and radiation curing polymerization.

The ratio of the (meth)acrylic acid alkyl ester having a $C_{1-20}$ linear or branched alkyl group to the total mass of the monomer components for preparing the acrylic polymer can be, for instance, 50% by mass to 99.9% by mass, preferably 60% by mass to 98% by mass, and more preferably 70% by mass to 95% by mass.

Examples of the (meth)acrylic acid alkyl ester having a $C_{1-20}$ linear or branched alkyl group include (meth)acrylic acid $C_{1-20}$ alkyl esters (preferably (meth)acrylic acid $C_{2-14}$ alkyl esters, and more preferably (meth)acrylic acid $C_{2-10}$ alkyl esters), such as, for example, (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid heptyl, (meth)acrylic acid octyl, (meth)acrylic acid 2-ethylhexyl, (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, (meth)acrylic acid dodecyl, (meth)acrylic acid tridecyl, (meth)acrylic acid tetradecyl, (meth)acrylic acid pentadecyl, (meth)acrylic acid hexadecyl, (meth)acrylic acid heptadecyl, (meth)acrylic acid octadecyl, (meth)acrylic acid isooctadecyl, (meth)acrylic acid nonadecyl, and (meth)acrylic acid eicosyl. Herein, the (meth)acrylic acid alkyl ester means an acrylic acid alkyl ester and/or a methacrylic acid alkyl ester, and all of the "(meth) . . . " expressions have the same meaning.

The acrylic polymer may contain another monomer component (copolymerizable monomer) that is copolymerizable with the (meth)acrylic acid alkyl ester, if necessary, in order to improve cohesive force, heat resistance, and a bridging characteristic, etc. Accordingly, the acrylic polymer may contain a copolymerizable monomer along with the (meth)acrylic acid alkyl ester as a major component. A monomer having a polar group can be preferably used as the copolymerizable monomer.

Specific examples of the copolymerizable monomer include: carboxyl group-containing monomers, such as acrylate, methacrylic acid, carboxyethyl acrylate, carboxypentyl acrylate, itaconic acid, maleic acid, fumaric acid, crotonic acid, and isocrotonic acid; hydroxyl group-containing monomers, such as (meth)acrylic acid hydroxyalkyls including (meth)acrylic acid 2-hydroxyethyl, (meth)acrylic acid 2-hydroxypropyl, (meth)acrylic acid 2-hydroxybutyl, (meth)acrylic acid 3-hydroxypropyl, (meth)acrylic acid 4-hydroxybutyl, (meth)acrylic acid 6-hydroxyhexyl, (meth)acrylic acid 8-hydroxyoctyl, (meth)acrylic acid 10-hydroxydecyl, (meth)acrylic acid 12-hydroxy lauryl, and (4-hydroxymethyl cyclohexyl)methyl methacrylate, etc.; acid anhydride group-containing monomers, such as maleic acid anhydride and itaconic acid anhydride; sulfonic group-containing monomers, such as styrenesulfonic acid, allylsulfonic acid, 2-(meth)acrylamide-2-methylpropanesulfonic acid, (meth)acrylamide propanesulfonic acid, sulfopropyl(meth)acrylate, and (meth)acryloyloxy naphthalenesulfonic acid; phosphate group-containing monomers, such as 2-hydroxyethyl acryloyl phosphate; (N-substituted) amide monomers, such as (meth)acrylamide, N,N-dialkyl (meth)acrylamides including N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide, and N,N-di(t-butyl)(meth)acrylamide, etc., N-ethyl(meth)acrylamide, N-isopropyl (meth)acrylamide, N-butyl(meth)acrylamide, N-n-butyl (meth)acrylamide, N-methylol(meth)acrylamide, N-ethylol (meth)acrylamide, N-methylol propane(meth)acrylamide, N-methoxymethyl(meth)acrylamide, N-methoxyethyl (meth)acrylamide, N-butoxymethyl(meth)acrylamide, and N-acryloyl morpholine; succinimide monomers, such as N-(meth)acryloyloxy methylene succinimide, N-(meth) acryloyl-6-oxy hexamethylene succinimide, and N-(meth) acryloyl-8-oxy hexamethylene succinimide; maleimide monomers, such as N-cyclohexyl maleimide, N-isopropylmaleimide, N-lauryl maleimide, and N-phenyl maleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide; vinyl esters, such as vinyl acetate and vinyl propionate; nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth) acryloyl-2-pyrrolidone, N-(meth)acryloylpiperidine, N-(meth)acryloyl pyrrolidine, N-vinyl morpholine, N-vinyl-2-piperidone, N-vinyl-3-morpholinone, N-vinyl-2-caprolactam, N-vinyl-1,3-oxazine-2-one, N-vinyl-3,5-morpholinedione, N-vinyl pyrazole, N-vinyl isoxazole, N-vinyl thiazole, N-vinyl isothiazole, and N-vinyl pyridazine; N-vinyl carboxylic acid amides; lactam monomers, such as N-vinyl caprolactam; cyano-containing monomers, such as acrylonitrile and methacrylonitrile; (meth)acrylic acid aminoalkyl monomers, such as (meth)acrylic acid aminoethyl, (meth)acrylic acid N,N-dimethylaminoethyl, (meth)acrylic acid N,N-dimethylaminoethyl, and (meth)acrylic acid t-butylaminoethyl; (meth)acrylic acid alkoxy alkyl monomers, such as (meth)acrylic acid methoxyethyl, (meth) acrylic acid ethoxyethyl, (meth)acrylic acid propoxyethyl, (meth)acrylic acid butoxyethyl, and (meth)acrylic acid ethoxypropyl; styrene monomers, such as styrene and α-methylstyrene; epoxy group-containing acrylic monomers, such as (meth)acrylic acid glycidyl; acrylic acid ester monomers having a heterocycle, halogen atom, silicon atom, or the like, such as (meth)acrylic acid tetrahydrofurfuryl, fluorine atom-containing (meth)acrylate, and silicone(meth) acrylate; olefin monomers, such as isoprene, butadiene, and isobutylene; vinyl ether monomers, such as methyl vinyl ether and ethyl vinyl ether; vinyl esters, such as vinyl acetate and vinyl propionate; aromatic vinyl compounds, such as vinyl toluene and styrene; olefins or dienes, such as ethylene, butadiene, isoprene, and isobutylene; vinyl ethers, such as vinyl alkyl ether; vinyl chloride; sulfonic acid group-containing monomers, such as vinyl sulfonate sodium; imide group-containing monomers, such as cyclohexyl maleimide and isopropyl maleimide; isocyanate group-containing monomers, such as 2-isocyanate ethyl(meth)acrylate; acryloyl morpholine; (meth)acrylic acid esters having an alicyclic hydrocarbon group, such as cyclopentyl(meth)acrylate, cyclohexyl(meth)acrylate, isobornyl(meth)acrylate, and dicyclopentanyl(meth)acrylate; (meth)acrylic acid esters having an aromatic hydrocarbon group, such as phenyl (meth)acrylate, and phenoxyethyl(meth)acrylate; (meth) acrylic acid esters obtained from terpene compound derivative alcohols; and the like. These copolymerizable monomers can be used alone or in combination of two or more thereof.

In the pressure-sensitive adhesive composition of the aforementioned aspect, it is preferable that the acrylic polymer contains, as a monomer unit, at least one monomer selected from the group consisting of N-vinyl cyclic amides (for instance, N-vinyl cyclic amides represented by the following general formula (M1)) and hydroxyl group-containing monomers.

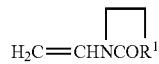
(M1)

(R$^1$ in the formula (M1) is a divalent organic group.)

It is particularly preferable to contain at least one monomer selected from the group consisting of the N-vinyl cyclic amides. The acrylic polymer may contain, as a monomer unit, both a monomer selected from the group consisting of the N-vinyl cyclic amides and a monomer selected from hydroxyl group-containing monomers.

Specific examples of the N-vinyl cyclic amides include N-vinyl-2-pyrrolidone, N-vinyl-2-piperidone, N-vinyl-3-morpholinone, N-vinyl-2-caprolactam, N-vinyl-1,3-oxazine-2-one, and N-vinyl-3,5-morpholinedione, etc. Among them, N-vinyl-2-pyrrolidone and N-vinyl-2-caprolactam are particularly preferred.

The use amount of N-vinyl cyclic amides is not particularly limited, but N-vinyl cyclic amides can be contained in an amount of usually 0.01% by mass or more, preferably 0.1% by mass or more, and more preferably 0.5% by mass or more, based on the total mass of the monomer components for preparing the acrylic polymer. In some embodiments, N-vinyl cyclic amides can be contained in an amount of usually 40% by mass or less, preferably 30% by mass or less, and more preferably 20% by mass or less, based on the total mass of the monomer components for preparing the acrylic polymer.

In addition, the use amount of copolymerizable monomer is not particularly limited, but copolymerizable monomers can be contained in an amount of usually 0.01% by mass or more, preferably 0.1% by mass or more, and more preferably 0.5% by mass or more, based on the total mass of the monomer components for preparing the acrylic polymer. In some embodiments, the copolymerizable monomers can be contained in an amount of 40% by mass or less, preferably 30% by mass or less, and more preferably 20% by mass or less, based on the total mass of the monomer components for preparing the acrylic polymer.

As specific examples of the hydroxyl group-containing monomers, (meth)acrylic acid 2-hydroxyethyl, (meth) acrylic acid 4-hydroxybutyl, and (meth)acrylic acid 6-hydroxyhexyl, etc., can be preferably used. The use amount of the hydroxy group-containing monomer is not particularly limited, but a copolymerizable monomer can be used in an amount of usually 40% by mass or less, preferably 20% by mass or less, and more preferably 10% by mass, based on the total mass of the monomer components for preparing the acrylic polymer.

By containing 0.01% by mass or more of the copolymerizable monomer, it can be prevented that the cohesive force of the pressure-sensitive adhesive sheet having a pressure-sensitive adhesive layer formed by the acrylic pressure-sensitive adhesive composition may be decreased. Further, by containing 40% by mass or less of the copolymerizable monomer, it can be prevented that the cohesive force thereof may become too large, and the tackiness at normal temperature (25° C.) can be improved.

In the present embodiment, when the pressure-sensitive adhesive sheet is used in a metal adherend or an adherend on which a metal film is formed (e.g., a touch panel, etc., on which a conductive film (ITO) is formed), it is desirable that a carboxyl group is not contained in the acrylic polymer. Also, from the viewpoint of corrosiveness, it is desirable that acidic functional groups, other than a carboxyl group, are not substantially contained therein. Accordingly, the monomer units that form the acrylic polymer of the present embodiment may not substantially contain a monomer having a carboxyl group or an acidic functional group other than a carboxyl group.

The acidic functional group means a functional group having active hydrogen. Examples of the acidic functional group include, for example, a carboxyl group, sulfonate group, phosphate group, etc. The expression that acidic functional groups "are not substantially contained" means that they are not actively combined, except the case where they are inevitably mixed. Specifically, it is meant that the ratio (% by mass) of a monomer having an acidic functional group to the total mass of units for forming the acrylic polymer is less than 1% by mass, and preferably less than 0.5% by mass.

Additionally, the acrylic polymer may contain, if necessary, a polyfunctional monomer for adjusting the cohesive force of the pressure-sensitive adhesive composition to be formed.

Examples of the polyfunctional polymer include, for example: (poly)ethylene glycol di(meth)acrylate, (poly)propylene glycol di(meth)acrylate, neopentyl glycol di(meth acrylate, pentaerythritol di(meth)acrylate, pentaerythritol tri (meth)acrylate, dipentaerythritol hexa(meth)acrylate, 1,2-ethylene glycol di(meth)acrylate, 1,6-hexanediol di(meth) acrylate, 1,12-dodecanediol di(meth)acrylate, trimethylolpropane tri(meth)acrylate, tetramethylol methane tri(meth)acrylate, allyl(meth)acrylate, vinyl(meth)acrylate, divinylbenzene, epoxy acrylate, polyester acrylate, urethane acrylate, butyldiol(meth)acrylate, and hexyldiol(meth)acrylate, etc. Among them, trimethylolpropane tri(meth)acrylate, hexanediol di(meth)acrylate, and dipentaerythritol hexa(meth)acrylate can be preferably used. The polyfunctional monomers can be used alone or in combination of two or more thereof.

The use amount of the polyfunctional monomer may vary depending on the molecular weight or the number of functional groups thereof, but it is usually suitably in a range of about 0.01 part to 3.0 parts by mass to 100 parts by mass of the acrylic polymer. In some embodiments, the amount of polyfunctional monomer used to 100 parts by mass of the acrylic polymer can be, for instance, 0.02 part by mass or greater, or even 0.03 part by mass or greater. With increasing amount of polyfunctional monomer used, the pressure-sensitive adhesive force at the beginning of attachment tends to be lower and the reworkability tends to be improved. On the other hand, from the standpoint of remaining moderate fluidity for facilitating an increase in pressure-sensitive adhesive force occurring over time, the amount of polyfunctional monomer used to 100 parts by mass of the acrylic polymer can be 2.0 parts by mass or less, 1.0 part by mass or less, or even 0.5 part by mass or less.

From the standpoint of facilitating to obtain a pressure-sensitive adhesive sheet favorably combining the low pressure-sensitive adhesive force at the beginning of attachment with an increase in pressure-sensitive adhesive force occurring over time, in some embodiments, the use amount of the polyfunctional monomer is suitably 0.01% by mass to 3.0% by mass, preferably 0.02% by mass to 2.0% by mass, and more preferably 0.03% by mass to 1.0% by mass, based on the total mass of the monomer components for preparing the acrylic polymer.

In preparing the acrylic polymer, the acrylic polymer can be easily formed by a curing reaction using heat or ultraviolet rays with the use of a polymerization initiator, such as a thermal polymerization initiator, photo-polymerization initiator (photo-initiator), or the like. In particular, photo-polymerization can be preferably used from the advantage that a pressure-sensitive adhesive property is improved, etc. The polymerization initiators can be used alone or in combination of two or more thereof.

Examples of the thermal polymerization initiator include, for example: azo polymerization initiators (e.g., 2,2'-azobisisobutyronitrile, 2,2'-azobis-2-methylbutyronitrile, 2,2'-azobis(2-methylpropionic acid)dimethyl, 4,4'-azobis-4-cyanovaleric acid, azobis isovaleronitrile, 2,2'-azobis(2-amidinopropane)dihydrochloride, 2,2'-azobis[2-(5-methyl-2-imidazoline-2-yl) propane] dihydrochloride, 2,2'-azobis (2-methylpropionamidine)disulfate, and 2,2'-azobis (N,N'-dimethyleneisobutylamidine)dihydrochloride, etc.); peroxide polymerization initiators (e.g., dibenzoyl peroxide, t-butyl permaleate, and lauroyl peroxide, etc.); redox polymerization initiators; and the like.

The use amount of the thermal polymerization initiator is not particularly limited, but the thermal polymerization initiator is combined, for example, in an amount of 0.01 parts by mass to 5 parts by mass, and preferably 0.05 parts by mass to 3 parts by mass, based on 100 parts by mass of the monomer components for preparing the acrylic polymer.

The photo-polymerization initiator is not particularly limited, but, for example, a benzoin ether photo-polymerization initiator, acetophenone photo-polymerization initiator, α-ketol photo-polymerization initiator, aromatic sulfonyl chloride photo-polymerization initiator, photoactive oxime photo-polymerization initiator, benzoin photo-polymerization initiator, benzyl photo-polymerization initiator, benzophenone photo-polymerization initiator, ketal photo-polymerization initiator, thioxanthone photo-polymerization initiator, acylphosphine oxide photo-polymerization initiator, or the like, can be used.

Specific examples of the benzoin ether photo-polymerization initiator include, for example, benzoin methyl ether, benzoin ethyl ether, benzoin propyl ether, benzoin isopropyl ether, benzoin isobutyl ether, 2,2-dimethoxy-1,2-diphenylethane-1-one [product name: IRGACURE 651 made by BASF], and Anisoin, etc. Specific examples of the acetophenone photo-polymerization initiator include, for example, 1-hydroxycyclohexyl phenyl ketone [product name: IRGACURE 184, made by BASF], 4-phenoxy dichloroacetophenone, 4-t-butyl-dichloroacetophenone, 1-[4-(2-hydroxyethoxy)-phenyl]-2-hydroxy-2-methyl-1-propane-1-one [product name: IRGACURE 2959, made by BASF], 2-hydroxy-2-methyl-1-phenyl-propane-1-one [product name: DAROCUR 1173, made by BASF], and methoxy acetophenone, etc. Specific examples of the α-ketol photo-polymerization initiator include, for example, 2-methyl-2-hydroxy propiophenone and 1-[4-(2-hydroxyethyl)-phenyl]-2-hydroxy-2-methylpropane-1-one, etc. Specific examples of the aromatic sulfonyl chloride photo-polymerization initiator include, for example, 2-naphthalene sulfonyl chloride, etc. Specific examples of the photoactive oxime photo-polymerization initiator include, for example, 1-phenyl-1,2-propanedione-2-(O-ethoxycarbonyl)-oxime, etc.

Specific examples of the benzoin photo-polymerization initiator include, for example, benzoin, etc. Specific examples of the benzyl photo-polymerization initiator include, for example, benzyl, etc. Specific examples of the benzophenone photo-polymerization initiators include, for example, benzophenone, benzoylbenzoic acid, 3,3'-dimethyl-4-methoxybenzophenone, polyvinyl benzophenone, and α-hydroxy cyclohexyl phenyl ketone, etc. Specific examples of the ketal photo-polymerization initiator include, for example, benzyl dimethyl ketal, etc. Specific examples of the thioxanthone photo-polymerization initiato include, for example, thioxanthone, 2-chlorothioxanthone, 2-methyl thioxanthone, 2,4-dimethyl thioxanthone, isopropyl thioxanthone, 2,4-dichloro thioxanthone, 2,4-diethyl thioxanthone, isopropyl thioxanthone, 2,4-diisopropyl thioxanthone, and dodecyl thioxanthone, etc.

Specific examples of the acylphosphine photo-polymerization initiator include, for example, bis(2,6-dimethoxybenzoyl)phenylphosphine oxide, bis(2,6-dimethoxybenzoyl)(2,4,4-trimethylpentyl) phosphine oxide, bis(2,6-dimethoxybenzoyl)-n-butyl phosphine oxide, bis(2,6-dimethoxybenzoyl)-(2-methylpropane-1-yl)phosphine oxide, bis(2,6-dimethoxybenzoyl)-(1-methylpropane-1-yl) phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octylphosphine oxide, bis(2-methoxybenzoyl)(2-methylpropane-1-yl)phosphine oxide, bis(2-methoxybenzoyl)(1-methylpropane-1-yl) phosphine oxide, bis(2,6-diethoxybenzoyl)(2-methylpropane-1-yl)phosphine oxide, bis(2,6-diethoxybenzoyl)(1-methylpropane-1-yl) phosphine oxide, bis(2,6-dibutoxybenzoyl)(2-methylpropane-1-yl) phosphine oxide, bis(2,4-dimethoxybenzoyl)(2-methypropane-1-yl) phosphine oxide, bis(2,4,6-trimethylbenzoyl)(2,4-dipentoxyphenyl) phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, 2,6-dimethoxybenzoyl benzylbutylphosphine oxide, 2,6-dimethoxybenzoyl benzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphin e oxide, bis(2,4,6-trimethyl benzoyl)-2,4-di-n-butoxy phenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl) isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, and tri(2-methylbenzoyl)phosphine oxide, etc.

The use amount of the photo-polymerization initiator is not particularly limited and can be selected so that a polymerization reaction proceeds properly. In some embodiments, the photo-polymerization initiator can be used, for example, in an amount of 0.01 part by mass to 5 parts by mass, and preferably 0.05 part by mass to 3 parts by mass, based on 100 parts by mass of the monomer components for preparing the acrylic polymer.

The photo-polymerization initiators can be used alone or in combination of two or more thereof.

In the present embodiment, the polymer (A) can also be prepared as a partial polymer (acrylic polymer syrup) whose monomer components are partially polymerized by irradiating a mixture, in which the monomer components and the polymerization initiator have been blended, with ultraviolet (UV) rays. The polymerization of the acrylic polymer syrup can be completed by blending the later-described polymer (B) into the syrup to prepare a pressure-sensitive adhesive composition and then by coating the pressure-sensitive adhesive composition onto a predetermined object to be coated followed by irradiation of ultraviolet rays. That is, the acrylic polymer syrup is a precursor of the polymer (A), and accordingly a composition, in which the polymer (B) has been blended into the acrylic polymer syrup, also corresponds to the pressure-sensitive adhesive composition of the present embodiment.

[Polymer (B)]

The polymer (B) contains, as a monomer unit, a monomer (B1) having a polyorganosiloxane skeleton. With the mobility and low polarity of the siloxane structure derived from the monomer (B1), the polymer (B) may serve as an adhesive strength rise retarder that contributes to a lower pressure-sensitive adhesive force at the beginning of attachment and to an increase in pressure-sensitive adhesive force occurring over time.

The monomer (B1) having a polyorganosiloxane skeleton that forms the polymer (B) is not particularly limited, but any polyorganosiloxane skeleton-containing monomer can be used. Due to the low polarity attributed to its structure, the monomer (B1) having a polyorganosiloxane skeleton facilitates concentration of the polymer (B) in the pressure-sensitive adhesive layer surface of the pressure-sensitive adhesive sheet prior to use (before applied to an adherend), thereby exhibiting light release (low adhesiveness) at the beginning of attachment to the adherend. A mono-terminally reactive monomer having a polyorganosiloxane skeleton can preferably be used for the monomer (B1). By using the monomer (B1) which is mono-terminally reactive, a polymer (B) having a siloxane structure in a side chain can be obtained. The use of the polymer (B) having such a structure may facilitate obtaining a pressure-sensitive adhesive sheet favorably combining the low pressure-sensitive adhesive force at the beginning of attachment with an increase in pressure-sensitive adhesive force occurring over time, due to the mobility of the polymer (B) and the motility of its side chain.

As specific examples of the polyorganosiloxane skeleton-containing monomer, for example, the polyorganosiloxane skeleton-containing monomers represented by the following general formula (1) or (2) can be used. More specifically, one-terminal reactive silicone oil made by Shin-Etsu Chemical Co., Ltd., such as X-22-174ASX, X-22-174DX, X-22-2426, and X-22-2475, can be cited, which can be used alone or in combination of two or more thereof.

[Chemical Formula 4]

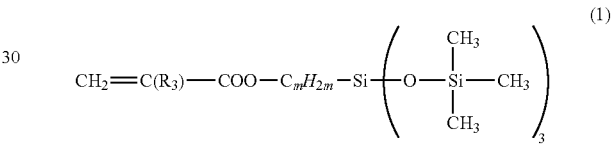

(1)

[Chemical Formua 5]

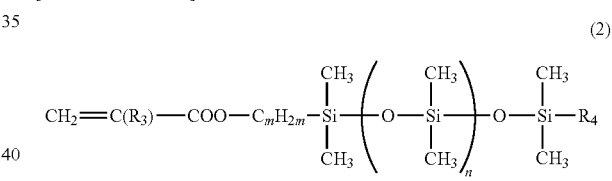

(2)

[wherein, $R_3$ is hydrogen or methyl; $R_4$ is methyl or a monovalent organic group; and each of m and n is an integer of 0 or more.]

The functional group equivalent (Fge) of the monomer (B1) having a polyorganosiloxane skeleton that forms the polymer (B) is not particularly limited to a specific range and can be selected so that the desired effect with the use of the monomer (B1) may preferably be obtained. In some embodiments, from the standpoint of the ease of sufficiently suppressing the pressure-sensitive adhesive force at the beginning of the attachment, the Fge of the monomer (B1) can be 140 g/mol or greater, 200 g/mol or greater, and normally advantageously 300 g/mol or greater (for instance, 500 g/mol or greater). In some embodiments, the Fge of the monomer (B1) can be suitably 700 g/mol or greater, preferably 800 g/mol or greater, more preferably 850 g/mol or greater, yet more preferably 1000 g/mol or greater, or particularly preferably 1500 g/mol or greater. In some embodiments, from the standpoint of facilitating to obtain a pressure-sensitive adhesive sheet favorably combining the low pressure-sensitive adhesive force at the beginning of attachment with an increase in pressure-sensitive adhesive force occurring over time, the Fge of the monomer (B1) can be 2500 g/mol or greater, 3000 g/mol or greater, 4500 g/mol or greater, 6000 g/mol or greater, 9000 g/mol or greater, 12000 g/mol or greater, or even 15000 g/mol or greater (for instance, 16000 g/mol or greater). The Fge of the monomer (B1) can be, for instance, about 50000 g/mol or less. From the standpoint of facilitating an increase in pressure-sensitive adhesive force occurring over time, the Fge of the monomer (B1) can be, for instance, preferably 30000 g/mol or less, more preferably 20000 g/mol or less. In some embodiments, the Fge of the monomer (B1) can be less than 18000 g/mol, less than 15000 g/mol, less than 10000 g/mol, less than 6000 g/mol, or even less than 5000 g/mol.

Herein, the "functional group equivalent" means the mass of a main skeleton (e.g., polydimethylsiloxane) bound to per functional group. The indicated unit of g/mol is obtained by converting into 1 mol of functional groups. The functional group equivalent of a monomer having a polyorganosiloxane skeleton is calculated from spectral intensities in $^1$H-NMR (proton NMR) obtained, for example, by a nuclear magnetic resonance (NMR) apparatus.

The ratio of the spectral intensity of H bound to Si of a siloxane structure via C (e.g., H in Si—$(CH_3)_2$) to the spectral intensity of H in a functional group of C—$CH_3$, SH, or C=$CH_2$ is determined in $^1$H-NMR obtained.

When the case is described as an example, where the ratio of the spectral intensity of H in a siloxane structure of Si—$(CH_3)_2$ to that of H in a functional group of C=$CH_2$ is determined, the ratio of the number of siloxane structures of Si—$(CH_3)_2$ to that of functional groups of C=$CH_2$, both being contained in a measurement sample, can be determined from the ratio of the spectral intensities.

Because the chemical formula of the siloxane structure and that of the functional group are known in advance, the ratio (A/B) of the number A of the siloxane structures each having an Si—$(CH_3)_2$ bond to the number B of the functional groups, the siloxane structures and the functional groups being contained in the measurement sample, can be determined from the ratio of the number of the siloxane structures of Si—$(CH_3)_2$ to the number of the functional groups of C=$CH_2$.

Because the molecular weight per one siloxane structure having an Si—$(CH_3)_2$ bond (herein, dimethylsiloxane) is known, the value, obtained by multiplying the molecular weight per one siloxane structure with the ratio (A/B) of the number A of the siloxane structures to the number of the functional groups, becomes the mass of the siloxane structure having an Si—$(CH_3)_2$ bond per one functional group, i.e., the mass of a main skeleton, and the value obtained by multiplying the mass thereof with the Avogadro's number becomes the functional group equivalent (g/mol).

When two or more monomers, each having a functional group equivalent different from those of the others and having a polyorganosiloxane skeleton, are used, the arithmetic mean value of the functional group equivalents can be used as the functional group equivalent of the monomers. That is, the functional group equivalent of the monomers can be calculated from the following equation: Functional group equivalent of monomer mixture (g/mol)=(Functional group equivalent of monomer 1×Blend amount of monomer 1+ . . . Functional group equivalent of monomer 2×Blend amount of monomer 2+ . . . Functional group equivalent of monomer n×Blend amount of monomer n)/(Blending amount of monomer 1+Blending amount of monomer 2+ . . . +Blending amount of monomer n)

The content of the monomer (B1) based on the mass of the total monomer components of the polymer (B) can be, for instance, 0.5% by mass or more, 1% by mass or more, 3% by mass or more, or even 4.5% by mass or more. In some embodiments, from the standpoint of suppressing the pressure-sensitive adhesive force at the beginning of attachment more effectively, the content of the monomer (B1) can be 5% by mass or more, 10% by mass or more, 15% by mass or more, or even 20% by mass or more. Although the content of the monomer (B1) based on the mass of the total monomer components of the polymer (B) can be 100% by mass, in view of the polymerization reactivity and compatibility, it may be normally preferably 80% by mass or less, 60% by mass or less, 50% by mass or less, 40% by mass or less, or even 30% by mass or less. In some embodiments, from the standpoint of facilitating to obtain a pressure-sensitive adhesive sheet favorably combining the low pressure-sensitive adhesive force at the beginning of attachment with an increase in pressure-sensitive adhesive force occurring over time, the content of the monomer (B1) can be 5% by mass or more but 50% by mass or less, preferably 10% by mass or more but 40% by mass or less, and more preferably 15% by mass or more but 30% by mass or less, based on the mass of the total monomer components of the polymer (B).

The monomer components for preparing the polymer (B) may contain a monomer (B2) whose homopolymer has a glass transition temperature of 40 C.° or higher, in addition to the monomer having a polyorganosiloxane skeleton described above. With the use of monomer (B2) whose homopolymer has a glass transition temperature of 40 C.° or higher in the polymer (B), pressure-sensitive adhesive force occurring at the beginning of attachment can be favorably suppressed and pressure-sensitive adhesive force can be suitably increased over time. In some embodiments, for the monomer (B2), a monomer whose homopolymer has a glass transition temperature of 60 C.° or higher can be preferably used. For instance, a monomer whose homopolymer has a glass transition temperature of 70 C.° or higher (preferably 80 C.° or higher, more preferably 90 C.° or higher, for instance, 100 C.° or higher) can be suitably used as the monomer (B2). For the monomer (B2), a monomer whose homopolymer has a glass transition temperature the satisfies any one or more conditions described herein can be used. For instance, (meth)acrylic monomers such as (meth)acrylic acid alkyl ester and (meth) acrylic acid ester having an alicyclic hydrocarbon group at an ester end can be used as a monomer (B2), although not limited thereto. Examples of monomers usable as monomer (B2) include (meth)acrylic monomers, such as, for example, dicyclopentanyl methacrylate (Tg: 175 C.°, dicyclopentanyl acrylate (Tg: 120 C.°), isobornyl methacrylate (Tg: 173 C.°), isobornyl acrylate (Tg: 97) C.°, methyl methacrylate (Tg: 105 C.°), 1-adamantyl methacrylate (Tg: 250 C.°), and 1-adamantyl acrylate (Tg: 153 C.°).

The polymer (B) may be a copolymer of the aforementioned (meth)acrylic monomer and the following monomer (however, the glass transition temperature of the homopolymer thereof is 40° C. or higher). Examples of the monomer copolymerizable with the aforementioned (meth)acrylic monomer include: amide group-containing vinyl monomers, such as acryloyl morpholine (Tg: 145° C.), dimethylacrylamide (Tg: 119° C.), diethylacrylamide (Tg: 81° C.), dimethylaminopropylacrylamide (Tg: 134° C.), isopropylacrylamide (Tg: 134° C.), and hydroxyethyl acrylamide (Tg: 98° C.); and lactam monomers, such as N-vinyl caprolactams including N-vinyl-2-caprolactam, etc.

The content of the monomer (B2) whose homopolymer has a glass transition temperature of 40 C.° or higher is not particularly limited to a specific range and can be selected so that the desired effect with the use of the monomer (B1) may preferably be obtained. In some embodiment, from the standpoint of facilitating to obtain a pressure-sensitive adhesive sheet favorably combining the low pressure-sensitive adhesive force at the beginning of attachment with an increase in pressure-sensitive adhesive force occurring over time, the content of the monomer (B2) based on the mass of the total monomer components of the polymer (B) can be, for instance, 10% by mass or more, preferably 20% by mass or more, and more preferably 30% by mass or more. In some embodiments, the content of the monomer (B2) based on the mass of the total monomer components of the polymer (B) can be, for instance, 80% by mass or less, preferably 60% by mass or less, and more preferably 50% by mass or less, based on the mass of the total monomer components of the polymer (B).

The monomer components for preparing the polymer (B) may contain a monomer (for instance, a (meth)acrylic monomer) whose homopolymer has a glass transition temperature lower than 80 C.° (for instance, −20 C.° or higher, but lower than 80 C.°). Examples of the (meth)acrylic monomer whose homopolymer has a glass transition temperature lower than 80 C.° include, for example, n-butyl methacrylate (Tg: 20 C.°) and 2-ethylhexyl methacrylate (Tg: −10 C.°), etc. In some embodiments, the monomer components for preparing the polymer (B) may contain a monomer whose homopolymer has a glass transition temperature lower than 80 C.° (for instance, lower than 60 C.°, or even lower than 40 C.°) and a monomer whose homopolymer has a glass transition temperature of 80 C.° or higher (for instance, 90 C.° or higher, or even 100 C.° or higher) in combination. This facilitates obtaining a pressure-sensitive adhesive sheet that may exhibit, after an increase in pressure-sensitive adhesive force occurring over time, favorable pressure-sensitive adhesive force and cohesive force in a well-balanced manner.

The polymer (B) may be a copolymer containing the monomer having a polyorganosiloxane skeleton, optionally containing the monomer (for instance, the (meth)acrylic monomer) whose homopolymer has a glass transition temperature of 40 C.° or higher, and further containing one or more monomers selected from the group consisting of a (meth)acrylic monomer having an alicyclic structure, a monomer having a polyoxyalkylene skeleton, a (meth)acrylic acid ester monomer, and a copolymerizable monomer.

Examples of such a (meth)acrylic acid ester monomer include: (meth)acrylic acid alkyl esters, such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid-2-ethylhexyl, (meth)acrylic acid heptyl, (meth)acrylic acid octyl, (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, and (meth)acrylic acid dodecyl; (meth)acrylic acid aryl esters, such as (meth)acrylic acid phenyl and (meth)acrylic acid benzyl; (meth)acrylic acid esters obtained from terpene compound derivative alcohols; and the like. These (meth)acrylic acid esters can be used alone or in combination of two or more thereof.

The polymer (B) can also be obtained by copolymerizing, other than the (meth)acrylic acid ester component unit, another monomer component (copolymerizable monomer) copolymerizable with the (meth)acrylic acid ester. For example, a functional group that is reactive with an epoxy group or an isocyanate group may be introduced into the polymer (B). Examples of such a functional group include a hydroxyl group, carboxyl group, amino group, amide group, and mercapt group, and a monomer having such a functional group may be used (copolymerized) in producing the polymer (B).

Examples of the another monomer that is copolymerizable with the (meth)acrylic acid ester include: carboxyl group-containing monomers, such as acrylic acid, methacrylic acid, carboxy ethyl acrylate, carboxypentyl acrylate, itaconic acid, maleic acid, fumaric acid, crotonic acid, and isocrotonic acid; (meth)acrylic acid alkoxy alkyl monomers, such as (meth)acrylic acid methoxyethyl, (meth)acrylic acid ethoxyethyl, (meth)acrylic acid propoxyethyl, (meth)acrylic acid butoxyethyl, and (meth)acrylic acid ethoxypropyl; salts, such as (meth)acrylic acid alkali metal salt; di(meth)acrylic acid ester monomers of (poly)oxyalkylene, such as di(meth)acrylic acid ester of ethylene glycol, di(meth)acrylic acid ester of diethylene glycol, di(meth)acrylic acid ester of triethylene glycol, di(meth)acrylic acid ester of polyethylene glycol, di(meth)acrylic acid ester of propylene glycol, di(meth)acrylic acid ester of dipropylene glycol, and di(meth)acrylic acid ester of tripropylene glycol; poly(meth)acrylic acid ester monomers, such as trimethylolpropane tri(meth)acrylic acid ester; vinyl esters, such as vinyl acetate and vinyl propionate; halogenated vinyl compounds, such as vinylidene chloride and (meth)acrylic acid-2-chloroethyl; oxazoline group-containing polymerizable compounds, such as 2-vinyl-2-oxazoline, 2-vinyl-5-methyl-2-oxazoline, and 2-isopropenyl-2-oxazoline; aziridine group-containing polymerizable compounds, such as (meth)acryloylaziridine and (meth)acrylic acid-2-aziridinylethyl; epoxy group-containing vinyl monomers, such as allyl glycidyl ether, (meth)acrylic acid glycidyl ether, and (meth)acrylic acid-2-ethyl glycidyl ether; hydroxyl group-containing vinyl monomers, such as (meth)acrylic acid-2-hydroxyethyl, (meth)acrylic acid-2-hydroxypropyl, and adducts between lactones and (meth)acrylic acid-2-hydroxyethyl; fluorine-containing vinyl monomers, such as fluorine-substituted (meth)acrylic acid alkyl ester; acid anhydride group-containing monomers, such as maleic acid anhydride and itaconic acid anhydride; aromatic vinyl compound monomers, such as styrene, α-methylstyrene, and vinyl toluene; reactive halogen-containing vinyl monomers, such as 2-chloroethyl vinyl ether and monochloro vinyl acetate; amide group-containing vinyl monomers, such as (meth)acrylamide, N-isopropyl (meth)acrylamide, N-butyl(meth)acrylamide, N,N-diethyl (meth)acrylamide, N,N-dimethyl(meth)acrylamide, N-methylol(meth)acrylamide, N-ethylol(meth)acrylamide, N-methylolpropane(meth)acrylamide, N-methoxyethyl (meth)acrylamide, N-butoxymethyl(meth)acrylamide, and N-acryloyl morpholine; succinimide monomers, such as N-(meth)acryloyloxy methylene succinimide, N-(meth)acryloyl-6-oxy hexamethylene succinimide, and N-(meth)acryloyl-8-oxy hexamethylene succinimide; maleimide monomers, such as N-cyclohexyl maleimide, N-isopropylmaleimide, N-lauryl maleimide, and N-phenyl maleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide; nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinyl morpholine, N-vinyl pyrazole, N-vinyl isoxazole, N-vinyl thiazole, N-vinyl isothiazole, and N-vinyl pyridazine; N-vinyl carboxylic acid amides; lactam monomers, such as N-vinyl caprolactam; cyanoacrylate monomers, such as (meth)acrylonitrile; (meth)acrylic acid aminoalkyl monomers, such as (meth) acrylic acid aminoethyl, (meth)acrylic acid N,N-dimethyl-aminoethyl, (meth)acrylic acid N,N-dimethylaminoethyl, and (meth)acrylic acid t-butylaminoethyl; imide group-containing monomers, such as cyclohexyl maleimide and isopropyl maleimide; isocyanate group-containing monomers, such as 2-isocyanate ethyl(meth)acrylate; organic silicon-containing vinyl monomers, such as vinyltrimethoxysilane, γ-methacryloxpropyl trimethoxy silane, allyltrimethoxysilane, trimethoxysilylpropylallylamine, and 2-methoxy ethoxy trimethoxy silane; hydroxyl group-containing monomers, such as (meth)acrylic acid hydroxyalkyls including (meth)acrylic acid hydroxyethyl, (meth)acrylic acid hydroxypropyl, (meth)acrylic acid hydroxybutyl, (meth) acrylic acid hydroxyhexyl, (meth)acrylic acid hydroxyoctyl, (meth)acrylic acid hydroxydecyl, (meth)acrylic acid hydroxy lauryl, and (4-hydroxymethyl cyclohexyl)methyl methacrylate; acrylic acid ester monomers having a heterocycle, halogen atom, silicon atom, or the like, such as (meth)acrylic acid tetrahydrofurfuryl, fluorine atom-containing (meth)acrylate, and silicone(meth)acrylate; olefin monomers, such as isoprene, butadiene, and isobutylene; vinyl ether monomers, such as methyl vinyl ether and ethyl vinyl ether; olefins or dienes, such as ethylene, butadiene, isoprene, and isobutylene; vinyl ethers, such as vinyl alkyl ether; vinyl chloride; and others, such as macromonomers having a radically polymerizable vinyl group at the monomer end to which a vinyl group has been polymerized, etc. These monomers can be copolymerized, alone or in combination thereof, with the (meth)acrylic acid esters.

In the polymer (B), the content of other monomer components, other than the monomer (B1) having a polyorganosiloxane skeleton and the monomer (B2) whose homopolymer has a glass transition temperature of 40 C.° or higher, is preferably 0% by mass or more but 85% by mass or less, more preferably 0% by mass or more but 70% by mass or less, and still more preferably 20% by mass or more but 55% by mass or less, based on the mass of the total monomer components of the polymer (B).

In some embodiments, the polymer (B) is preferably the polymer having substantially no functional group which causes a crosslinking reaction with the polymer (A). In other words, in such embodiments, the polymer (B) is preferably contained in the pressure-sensitive adhesive layer without chemically bonded to the polymer (A). The pressure-sensitive adhesive layer containing the polymer (B) in such a form is suitable to exhibit both the low pressure-sensitive adhesive force at the beginning of attachment and an increase in pressure-sensitive adhesive force occurring over time, due to the good mobility of the polymer (B). The functional group which causes a crosslinking reaction with the polymer (A) may vary depending on the type of the functional group in the polymer (A), but may be, for example, an epoxy group, an isocyanate group, a carboxy group, an alkoxysilyl group.

The weight average molecular weight (MwB) of the polymer (B) is not particularly limited and can be selected so that the desired effect with the use of the polymer (B) may preferably be obtained. The weight average molecular weight (MwB) can be, for instance, 1000 or more, or 5000 or more. From the standpoint of favorably combining the low pressure-sensitive adhesive force at the beginning of attachment with an increase in pressure-sensitive adhesive force occurring over time, in some embodiments, the MwB can be, for instance, 10000 or more, 12000 or more, 15000 or more, and even 20000 or more. In some embodiments, the MwB can be 50000 or more, 80000 or more, 100000 or more, or even 120000 or more (for instance, 150000 or more). The MwB can be, for instance, 500000 or less, 350000 or less, 250000 or less, 150000 or less, or even 100000 or less. From the standpoint of the ease of sufficiently suppressing the pressure-sensitive adhesive force at the beginning of the attachment, in some embodiments, the MwB can be less than 100000, less than 80000, less than 70000, less than 50000, less than 40000, less than 20000, or even less than 10000.

The weight average molecular weights of the polymer (A) and the polymer (B) can be determined by a gel permeation chromatography (GPC) method and by polystyrene conversion. Specifically, the measurement is performed in accordance with the method and conditions described in the later-described Examples.

The polymer (B) can be produced by polymerizing the aforementioned monomers with, for example, a solution polymerization method, bulk polymerization method, emulsion polymerization method, suspension polymerization, block polymerization, or the like.

In order to adjust the molecular weight of the polymer (B), a chain transfer agent can be used during the polymerization. Examples of the chain transfer agent to be used include: compounds having a mercapt group, such as octylmercaptan, laurylmercaptan, t-nonyl mercaptan, t-dodecyl mercaptan, mercaptoethanol, and α-thioglycerol; thioglycolic acid, methyl thioglycolate, ethyl thioglycolate, propyl thioglycolate, butyl thioglycolate, t-butyl thioglycolate, 2-ethylhexyl thioglycolate, octyl thioglycolate, isooctyl thioglycolate, decyl thioglycolate, dodecyl thioglycolate, and thioglycolic acid esters including thioglycolic acid ester of ethylene glycol, thioglycolic acid ester of neopentyl glycol, and thioglycolic acid ester of pentaerythritol; α-methylstyrene dimer; and the like.

The use amount of the chain transfer agent is not particularly limited, but is contained in an amount of usually 0.05 parts by mass to 20 parts by mass, preferably 0.1 parts by mass to 15 parts by mass, and more preferably 0.2 parts by mass to 10 parts by mass, based on 100 parts by mass of the monomer. By thus adjusting the addition amount of the chain transfer agent, the (meth)acrylic polymer (B) having a preferred molecular weight can be obtained. The chain transfer agents can be used alone or in combination of two or more thereof.

[Pressure-Sensitive Adhesive Composition]

The pressure-sensitive adhesive composition includes the aforementioned polymer (A) and the polymer (B). The content of the polymer (B) relative to the content of the polymer (A) can be selected so that both the low pressure-sensitive adhesive force at the beginning of attachment and an increase in pressure-sensitive adhesive force occurring over time may favorably obtained. In some embodiments, the content of the polymer (B) based on 100 parts by mass of the polymer (A) can be, for instance, 0.1 part by mass or more, 0.3 part by mass or more, 0.4 part by mass or more, 0.5 part by mass or more, 1 past by mass or more, or even 2 parts by mass or more. In some embodiments, from the standpoint of reworkability, the content of the polymer (B) can be 3 parts by mass or more, 4 parts by mass or more, or even 5 parts by mass or more. The content of the polymer (B) based on 100 parts by mass of the polymer (A) can be, for instance, 75 parts by mass or less, 60 parts by mass or less, or even 50 parts by mass or less. From the standpoint of avoiding the cohesiveness in the pressure-sensitive adhesive layer being excessively low, in some embodiments the content of the polymer (B) based on 100 parts by mass of the polymer (A) can be, for instance, 40 parts by mass or less, 35 parts by mass or less, 30 parts by mass or less, or even 25 parts by mass or less. In some embodiments, from the standpoint of obtaining a pressure-sensitive adhesive sheet exhibiting higher pressure-sensitive adhesive force after an increase in occurring over time, the content of the polymer (B) based on 100 parts by mass of the polymer (A) can be 20 parts by mass or less, 17 parts by mass or less, 15 parts by mass or less, 12 parts by mass or less, 10 parts by mass or less, 8 parts by mass or less, 6 parts by mass or less, or even 4 parts by mass or less (for instance, 3 parts by mass or less).

The pressure-sensitive adhesive composition may contain, other than the aforementioned polymer (A) and polymer (B), various types of additives that are common in the field of pressure-sensitive adhesive compositions, as optional components. Such optional components are exemplified by a tackifying resin, cross-linking agent, catalyst, plasticizer, softener, filler, colorant (pigment, dye, or the like), antioxidant, leveling agent, stabilizer, antiseptic, and antistatic agent, etc. Such additives that are conventionally and publicly known can be used by ordinary methods.

In order to adjust the cohesive force of the later-described pressure-sensitive adhesive layer, a cross-linking agent can also be used other than the aforementioned various monomers. Commonly-used cross-linking agents can be used as the cross-linking agent. Examples of the cross-linking agents include, for example, an epoxy cross-linking agent, isocyanate cross-linking agent, silicone cross-linking agent, oxazoline cross-linking agent, aziridine cross-linking agent, silane cross-linking gent, alkyl-etherified melamine cross-linking agent, and metal chelate cross-linking agent, etc. In particular, an isocyanate cross-linking agent, epoxy cross-linking agent, and metal chelate cross-linking agent can be preferably used. These compounds may be used alone or in combination of two or more thereof.

Specific examples of the isocyanate cross-linking agent include tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethyl xylylene diisocyanate, naphthalene diisocyanate, triphenyl-methane triisocyanate, polymethylene polyphenyl isocyanate, and adducts of these compounds with polyols such as trimethylolpropane. Additionally, a compound having, in one molecule, at least one isocyanate group and one or more unsaturated bonds, specifically 2-isocyanate ethyl(meth) acrylate, etc., can also be used as the isocyanate cross-linking agent. These compounds may be used alone or in combination of two or more thereof.

Examples of the epoxy cross-linking agent include, bisphenol A, epichlorohydrin type epoxy resin, ethylenegly-cidylether, polyethylene glycol diglycidyl ether, glycerin diglycidyl ether, glycerin triglycidyl ether, 1,6-hexanediol glycidyl ether, trimethylolpropane triglycidyl ether, diglycidyl aniline, diamine glycidyl amine, N,N,N',N'-tetraglycidyl-m-xylylenediamine, and 1,3-bis(N,N-diglycidyl aminomethyl) cyclohexane, etc. These compounds may be used alone or in combination of two or more thereof.

Examples of the metal chelate compound include: as metal components, aluminum, iron, tin, titanium, and nickel; and as chelate components, acetylene, methyl acetoacetate, and ethyl lactate, etc. These compounds may be used alone or in combination of two or more thereof.

When using a crosslinking agent, its amount used is not particularly limited. For instance, its amount can be greater than 0 part by mass relative to 100 parts by mass of the polymer (A). The amount of crosslinking agent used to 100 parts by mass of the polymer (A) can be, for instance, 0.01 part by mass or greater, or preferably 0.05 part by mass or greater. With increasing amount of crosslinking agent used, the pressure-sensitive adhesive force at the beginning of attachment tends to be lower and the reworkability tends to be improved. In some embodiments, the amount of crosslinking agent used to 100 parts by mass of the polymer (A) can be 0.1 part by mass or greater, 0.5 part by mass or greater, or even 0.8 part by mass or greater. On the other hand, from the standpoint of allowing the adequate mobility (migration) of the polymer (B) in the pressure-adhesive layer to facilitate an increase in pressure-sensitive adhesive force occurring over time, the amount of crosslinking agent used to 100 parts by mass of the polymer (A) is usually suitably 15 parts by mass or less, 10 parts by mass or less, or even 5 parts by mass or less.

In some embodiments, from the standpoint of obtaining a pressure-sensitive adhesive sheet favorably combining adequate cohesive force with an increase in pressure-sensitive adhesive force occurring over time, the cross-linking agent is preferably contained, in an amount of 0.01 parts by mass to 15 parts by mass, and more preferably contained in an amount of 0.5 parts by mass to 10 parts by mass, based on 100 parts by mass of the polymer (A).

In some embodiments, at least an isocyanate-based crosslinking agent can be used as the crosslinking agent. From the standpoint of obtaining a pressure-sensitive adhesive sheet favorably combining the low pressure-sensitive adhesive force at the beginning of attachment with an increase in pressure-sensitive adhesive force occurring over time, in some embodiments, the amount of the isocyanate-based crosslinking agent used to 100 parts by mass of the polymer (A) can be, for instance, 0.01 parts by mass or more, 0.1 parts by mass or more, 0.3 parts by mass or more, or even 0.5 parts by mass or more, and it can be, for instance, 5 parts by mass or less, 4 parts by mass or less, or even 3 parts by mass or less.

The pressure-sensitive adhesive composition disclosed herein may further include a cross-linking catalyst for further effectively promoting any one of the aforementioned cross-linking reactions. As such a cross-linking catalyst, for example, a tin catalyst (in particular, dioctyl tin dilaurate) can be preferably used. The use amount of the cross-linking catalyst (e.g., a tin catalyst such as dioctyl tin dilaurate) is not particularly limited, but the use amount may be, for example, approximately 0.0001 parts by mass to 1 part by mass, based on 100 parts by mass of the polymer (A).

The tackifying resin is not particularly limited. Examples thereof include, for example, a rosin tackifying resin, terpene tackifying resin, phenol tackifying resin, hydrocarbon tackifying resin, ketone tackifying resin, polyamide tackifying resin, epoxy tackifying resin, and elastomer tackifying resin, etc.

Examples of the rosin tackifying resin include, for example, unmodified rosin (raw rosin), such as gum rosin, wood rosin, and tall oil rosin; modified rosins obtained by modifying these unmodified rosin with polymerization, disproportionation, and hydrogenation, etc. (polymerized rosin, stabilized rosin, disproportionated rosin, completely hydrogenated rosin, partially hydrogenated rosin, and chemically modified other rosin, etc.); and various rosin derivatives. Examples of the rosin derivatives include, for example: rosin phenol resins obtained by adding phenol to rosins (unmodified rosin, modified rosin, and various rosin derivatives, etc.) with an acid catalyst followed by being subjected to thermal polymerization; rosin ester resins, such as rosin ester compounds (unmodified rosin esters) obtained by esterifying unmodified rosin with alcohols, and modified rosin ester compounds (such as polymerized rosin ester, stabilized rosin ester, disproportionated rosin ester, completely hydrogenated rosin ester, and partially hydrogenated rosin ester) obtained by esterifying modified rosin (such as polymerized rosin, stabilized rosin, disproportionated rosin, completely hydrogenated rosin, and partially hydrogenated rosin) with alcohols; unsaturated fatty acid-modified rosin resins obtained by modifying unmodified rosin or modified rosin (polymerized rosin, stabilized rosin, disproportionated rosin, completely hydrogenated rosin, and partially hydrogenated rosin, etc.) with an unsaturated fatty acid; unsaturated fatty acid-modified rosin ester resins obtained by modifying rosin ester resins with an unsaturated fatty acid; rosin alcohol resins obtained by subjecting carboxyl groups in unmodified rosin, modified rosin (polymerized rosin, stabilized rosin, disproportionated rosin, completely hydrogenated rosin, and partially hydrogenated rosin, etc.), unsaturated fatty acid-modified rosin resins, or unsaturated fatty acid-modified rosin esters to a reduction treatment; metal salts of rosin resins (in particular, rosin ester resins), such as unmodified rosin, modified rosin, and various rosin derivatives; and the like.

Examples of the terpene tackifying resin include, for example: terpene resins, such as an α-pinene polymer, β-pinene polymer, and dipentene polymer; modified terpene resins obtained by modifying (phenol modification, aromatic modification, hydrogenation modification, and hydrocarbon modification, etc.) these terpene resins (e.g., a terpene phenol resin, styrene modified terpene resin, aromatic modified terpene resin, and hydrogenated terpene resin, etc.); and the like.

Examples of the phenol tackifying resin include, for example: condensates of various phenols (e.g., phenol, m-cresol, 3,5-xylenol, p-alkylphenol, and resorcinol, etc.) and formaldehydes (e.g., an alkylphenol resin and xylene-formaldehyde resin, etc.); resols obtained by subjecting the phenols and the formaldehydes to an addition reaction with an alkali catalyst; novolacs obtained by subjecting the phenols and the formaldehydes to a condensation reaction with an acid catalyst; and the like.

Examples of the hydrocarbon tackifying resin (petroleum tackifying resin) include, for example: aliphatic hydrocarbon resins [polymers of aliphatic hydrocarbons, such as $C_{4-5}$ olefins and dienes (olefins such as butene-1, isobutylene, and pentene-1; and dienes such as butadiene, 1,3-pentadiene, and isoprene)]; aliphatic cyclic hydrocarbon resins [alicyclic hydrocarbon resins obtained by subjecting a so-called "$C_4$ petroleum fraction" or "$C_5$ petroleum fraction" to cyclization/dimerization followed by being subjected to polymerization; polymers of cyclic diene compounds (cyclopentadiene, dicyclopentadiene, ethylidene norbornene, and dipentene, etc.) or hydrogenated compounds thereof; and alicyclic hydrocarbon resins obtained by hydrogenating the aromatic ring of the following aromatic hydrocarbon resins and aliphatic and aromatic petroleum resins]; aromatic hydrocarbon resins [polymers of $C_{8-10}$ vinyl group-containing aromatic hydrocarbons (styrene, vinyl toluene, α-methylstyrene, indene, and methylindene, etc.)]; aliphatic and aromatic petroleum resins (styrene-olefin copolymers, etc.); aliphatic and alicycle petroleum resins; hydrogenated hydrocarbon resins; cumarone resins; cumarone indene resins; and the like.

Commercially available products of the polymerized rosin ester that can be preferably used are exemplified by the products with the names of "PENSEL D-125", "PENSEL D-135", "PENSEL D-160", "PENSEL KK", and "PENSEL C", etc., which are all made by ARAKAWA CHEMICAL INDUSTRIES, LTD., but are not limited thereto.

Commercially available products of the terpene phenol resin that can be preferably used are exemplified by the products: with the names of "YS Polystar S-145" "YS Polystar G-125", "YS Polystar N125", "YS Polystar U-115", which are made by YASUHARA CHEMICAL CO., LTD.; with the names of "TAMANOL 803L" and "TAMANOL 901", which are made by ARAKAWA CHEMICAL INDUSTRIES, LTD.; with the name of "SUMILITE RESIN PR-12603" made by SUMITOMO BAKELITE CO., LTD.; and the like; but are not limited thereto.

[Pressure-Sensitive Adhesive Layer and Pressure-Sensitive Adhesive Sheet]

Subsequently, the structure of a pressure-sensitive adhesive sheet, having a pressure-sensitive adhesive layer including a pressure-sensitive adhesive composition having the aforementioned composition, will be described.

The pressure-sensitive adhesive layer can be a layer in which a pressure-sensitive adhesive composition has been cured. That is, the pressure-sensitive adhesive layer can be formed by providing the pressure-sensitive adhesive composition to an appropriate supporting body (e.g., application, coating) and then by appropriately subjecting it to a curing treatment. When two or more types of curing treatments (drying, cross-link formation, polymerization, etc.) are performed, these treatments can be performed simultaneously or in multiple stages. In the case of the pressure-sensitive adhesive composition using a partial polymer (acrylic polymer syrup), a final copolymerization reaction is typically performed as the curing treatment (the partial polymer is subjected to a further copolymerization reaction to form a complete polymer). For example, in the case of a photo-curing pressure-sensitive adhesive composition, light irradiation is performed. A curing treatment, such as cross-link formation, drying, or the like, may be performed, if necessary. For example, when a photo-curing pressure-sensitive adhesive composition needs to be dried, photo-curing may be performed after the drying of the composition. In the case of a pressure-sensitive adhesive composition using a complete polymer, a treatment, such as drying (drying by heating), cross-link formation, or the like, is typically performed as the curing treatment, if necessary.

The application/coating of the pressure-sensitive adhesive composition can be performed by using a commonly-used coater, such as, for example, a gravure roll coater, reverse roll coater, kiss roll coater, dip roll coater, bar coater, knife coater, spray coater, or the like. Alternatively, the pressure-sensitive adhesive layer may be formed by directly providing the pressure-sensitive adhesive composition to a supporting body, or the pressure-sensitive adhesive layer formed on a release liner may be transferred to a supporting body.

The ratio of a solvent-insoluble component in the pressure-sensitive adhesive layer is not particularly limited. The ratio of a solvent-insoluble component can be, for instance, within a range of 20.0% by mass to 99.0% by mass, and normally suitably within a range of 30.0% by mass to 90.0% by mass. From the standpoint of obtaining a pressure-sensitive adhesive sheet favorably combining adequate cohesive force with an increase in pressure-sensitive adhesive force occurring over time, in some embodiments, the ratio of a solvent-insoluble component in the pressure-sensitive adhesive layer can be within a range of 55.0% by mass to 99.0% by mass, and preferably within a range of 60.0% by mass to 95.0% by mass. A method of evaluating the ratio of a solvent-insoluble component will be described later.

The thickness of the pressure-sensitive adhesive layer is not particularly limited, and can be, for instance, 1 μm or larger. In some embodiments, the thickness of the pressure-sensitive adhesive layer may be, for instance, usually 3 μm or larger, 5 μm or larger, 8 μm or larger, 10 μm or larger, 15 μm or larger, or even 20 μm or larger or larger than 20 μm. With the increase in thickness of the pressure-sensitive adhesive layer, the pressure-sensitive adhesive force observed after an increase in pressure-sensitive adhesive force occurring over time tends to be greater. In some embodiments, the thickness of the pressure-sensitive adhesive layer can be, for instance, 300 μm or less, 200 μm or less, 150 μm or less, 100 μm or less, 70 μm or less, 50 μm or less, or even 40 μm or less. From the standpoint of reducing the total thickness of the pressure-sensitive adhesive sheet and/or avoiding the occurrence of cohesive failure in the pressure-sensitive adhesive layer, it may be advantageous that the thickness of the pressure-sensitive adhesive layer is not excessively large.

The pressure-sensitive adhesive sheet according to the present embodiment comprises a pressure-sensitive adhesive layer made of the pressure-sensitive adhesive composition. The pressure-sensitive adhesive sheet disclosed herein may be in a form that a pressure-sensitive adhesive layer is provided on at least one surface of a supporting body in a fixed manner, i.e., without an intention of separating the pressure-sensitive adhesive layer from the supporting body, or in a form without a supporting body fixed to the pressure-sensitive adhesive layer and typically formed solely of the pressure-sensitive adhesive layer (a supporting body-free pressure-sensitive adhesive sheet).

In case that the pressure-sensitive adhesive sheet disclosed herein is in a form of a double-faced pressure-sensitive adhesive sheet having a first pressure-sensitive adhesive layer on a first side of the supporting body and a second pressure-sensitive adhesive layer on a second side of the supporting body, the aforementioned pressure-sensitive adhesive layer's thickness can be applied to at least the thickness of the first pressure-sensitive adhesive layer. The thickness of the second pressure-sensitive adhesive layer may also be selected from the aforementioned pressure-sensitive adhesive layer's thickness. In case of a supporting body-free pressure-sensitive adhesive sheet formed of a pressure-sensitive adhesive layer, the pressure-sensitive adhesive layer's thickness is equal to the pressure-sensitive adhesive sheet's thickness.

The concept of the pressure-sensitive adhesive sheet described herein can involve objects referred to as a pressure-sensitive adhesive tape, a pressure-sensitive adhesive film, and a pressure-sensitive adhesive label, etc. The pressure-sensitive adhesive sheet may be one cut or punched into an appropriate shape in accordance with its purpose of use. The pressure-sensitive adhesive layer is not limited to one continuously formed, but may be one formed into a regular pattern, such as, for example, a dot shape and a stripe shape, or formed into a random pattern.

The aforementioned supporting body can be formed of a material appropriately selected, in accordance with the application of the pressure-sensitive adhesive tape, from the group consisting of, for example: plastic films, such as polyolefin films including polyethylene, polypropylene, poly-1-butene, poly-4-methyl-1-pentene, ethylene propylene copolymer, ethylene 1-butene copolymer, ethylene vinyl acetate copolymer, ethylene ethyl acrylate copolymer, and ethylene vinyl alcohol copolymer, polyester films including polyethylene terephthalate, polyethylene naphthalate, and polybutylene terephthalate, polyacrylate film, polystyrene film, polyamide films including nylon 6, nylon 6,6, and partially aromatic polyamide, polyvinylchloride film, polyvinylidene chloride film, and polycarbonate film; foam substrates, such as a polyurethane foam, and polyethylene foam; paper, such as craft paper, crepe paper, and Japanese paper; cloth, such as cotton cloth and staple fiber cloth; nonwoven cloth, such as polyester nonwoven cloth and vinylon nonwoven cloth; metallic foils, such as aluminum foil and copper foil; and the like.

The supporting body can also be subjected to, if necessary: a mold-release and antifouling treatment using a release agent, such as a silicone release agent, fluorine release agent, long-chain alkyl release agent, or fatty acid amide release agent, and a silica powder; and an easy-adhesion treatment, such as an acid treatment, alkali treatment, primer treatment, corona treatment, plasma treatment, ultraviolet treatment, or the like. The thickness of the supporting body can be appropriately selected in accordance with its purpose, but is generally within a range of approximately 5 μm to 200 μm (typically within a range of 10 μm to 100 μm).

The supporting body can also be subjected to, if necessary: a mold-release and antifouling treatment using a release agent, such as a silicone release agent, fluorine release agent, long-chain alkyl release agent, or fatty acid amide release agent, and a silica powder; an easy-adhesion treatment, such as an acid treatment, alkali treatment, primer treatment, corona treatment, plasma treatment, ultraviolet treatment, or the like; and an antistatic treatment, such as a coating type, kneading type, vapor deposition type, or the like.

In order to protect a pressure-sensitive adhesive surface, a release liner can be attached, if necessary, to the surface of the pressure-sensitive adhesive layer in the pressure-sensitive adhesive sheet of the present embodiment.

Paper or a plastic film can be used as a material for forming the release liner, but a plastic film is preferably used because it is excellent in surface smoothness. The film is not particularly limited, as far as it can protect the pressure-sensitive adhesive layer. Examples of the film include, for example, a polyethylene film, polypropylene film, polybutene film, polybutadiene film, polymethylpentene film, polyvinylchloride film, vinylchloride copolymer film, polyethylene terephthalate film, polybutylene terephthalate film, polyurethane film, and ethylene-vinylacetate copolymer film, etc.

The thickness of the release liner is usually within a range of 5 μm to 200 μm, and preferably within a range of approximately 10 μm to 100 μm. When the thickness is within the aforementioned range, the release liner is excellent in the workability for attaching to the pressure-sensitive adhesive layer and the workability for releasing therefrom, and hence the release liner is preferred. The release liner can also be subjected to, if necessary: a mold-release and antifouling treatment using a release agent, such as a silicone release agent, fluorine release agent, long-chain alkyl release agent, or fatty acid amide release agent, and a silica powder; and an antistatic treatment, such as an coating type, kneading type, vapor deposition type, or the like.

The pressure-sensitive adhesive sheet has the characteristics that: the pressure-sensitive adhesive force thereof is small immediately after being attached to an adherend, and hence rework can be performed; the pressure-sensitive adhesive force is increased over time; and the adhesion reliability is high. The pressure-sensitive adhesive force, occurring immediately after the pressure-sensitive adhesive sheet is attached (after 30 minutes at room temperature), can be evaluated by a 180°-peeling pressure-sensitive adhesive force test performed under the conditions in which a tensile speed is 300 mm/min and a peeling angle is 180°. The 180°-peeling pressure-sensitive adhesive force test is performed in accordance with the method and conditions described in the later-described Examples.

Additionally, the pressure-sensitive adhesive force of the pressure-sensitive adhesive sheet, occurring over time, can be evaluated by a 180°-peeling pressure-sensitive adhesive force test performed under the conditions in which a tensile speed is 300 mm/min and a peeling angle is 180°. The 180°-peeling pressure-sensitive adhesive force test is performed in accordance with the method and conditions described in the later-described Examples.

Further, the pressure-sensitive adhesive sheet has a characteristic that contamination occurring when the sheet is peeled (hereinafter, referred to as a contamination property) is little. The contamination property of the pressure-sensitive adhesive sheet is evaluated in accordance with the method and conditions described in the later-described Examples.

The pressure-sensitive adhesive sheet of the present embodiment has characteristics that: the pressure-sensitive adhesive force, occurring at the beginning of attachment, is as low as rework can be performed; thereafter the sheet is firmly adhered to an adherend; and further contamination is little when the sheet is peeled. Accordingly, the pressure-sensitive adhesive sheet can be preferably used: in optical applications in which optical films to be used in image display apparatuses, such as a liquid crystal display, plasma display, and organic EL display, are adhered, etc.; and also as materials for joining members in mobile devices and other electrical and electronic equipment, etc., or as materials for joining various members in automobiles and home electronic appliances, etc.

EXAMPLES

Hereinafter, examples of the present invention will be described, which do not intend to limit the scope of the invention at all, but are presented as exemplifications for preferably describing the invention.
(Preparation of Acrylic Polymer Syrup 1 (2EHA/NVP=86/14) as (A) Component)

Eighty six parts by mass of 2-ethylhexyl acrylate (2EHA), 14 parts by mass of N-vinyl-2-pyrrolidone (NVP), 0.05 parts by mass of a photo-polymerization initiator (product name: IRGACURE 184, made by BASF), and 0.05 parts by mass of a photo-polymerization initiator (product name: IRGACURE 651, made by BASF) were placed into a 4-neck flask. A partial polymer (acrylic polymer syrup) having a polymerization rate of approximately 8% by mass was obtained by exposing the mixture to ultraviolet rays under a nitrogen atmosphere to be partially photopolymerized.
(Preparation of Acrylic Polymer Syrup 2 (2EHA/AA=94/6) as (A) Component)

Ninety four parts by mass of 2-ethylhexyl acrylate (2EHA), 6 parts by mass of acrylic acid (AA), 0.05 parts by mass of a photo-polymerization initiator (product name: IRGACURE 184, made by BASF), and 0.05 parts by mass of a photo-polymerization initiator (product name: IRGACURE 651, made by BASF) were placed into a 4-neck flask. A partial polymer (acrylic polymer syrup) having a polymerization rate of approximately 8% by mass was obtained by exposing the mixture to ultraviolet rays under a nitrogen atmosphere to be partially photopolymerized.
(Preparation of (Meth)acrylic Polymer 1 (MMA/BMA/2 EHMA/X-22-174 ASX/X-22-174DX=40/20/20/17/3) as (B) Component)

One hundred parts by mass of toluene, 40 parts by mass of methyl methacrylates (MMA), 20 parts by mass of butyl methacrylate (BMA), 20 parts by mass of 2-ethylhexyl methacrylate (2-EHMA), 17 parts by mass of a methacrylate monomer having a functional group equivalent of 900 g/mol and containing a polyorganosiloxane skeleton (product name: X-22-174ASX, made by Shin-Etsu Chemical Co., Ltd.), 3 parts by mass of a methacrylate monomer having a functional group equivalent of 4600 g/mol and containing a polyorganosiloxane skeleton (product name: X-22-174DX, made by Shin-Etsu Chemical Co., Ltd.), and 0.51 parts by mass of methyl thioglycolate as a chain transfer agent were placed into a 4-neck flask provided with a stirring blade, thermometer, nitrogen gas inlet pipe, cooler, and dropping funnel. After they were stirred under a nitrogen atmosphere at 70° C. for 1 hour, 0.2 parts by mass of azobisisobutyronitrile were placed therein as a thermal polymerization initiator to react with them at 70° C. for 2 hours. Thereafter, 0.1 parts by mass of azobisisobutyronitriles were placed therein as a thermal polymerization initiator to subsequently react with them at 80° C. for 5 hours. The weight average molecular weight of the obtained (meth)acrylic polymer 1 was 22800.
((Meth)Acrylic Polymer as Another (B) Component)

Each of (Meth)acrylic Polymers 2 to 11 was produced in the same way as (Meth)acrylic Polymer 1, except that a monomer composition, the type of a solvent, and the parts by mass of a chain transfer agent were added in the way described in Table 1.

TABLE 1

| No. | COMPOSITION | COPOLYMERIZATION RATIO |
| --- | --- | --- |
| (METH)ACRYLIC POLYMER 1 | MMA/BMA/2EHMA/X22-174ASX/X22-174DX | 40/20/20/17/3 |
| (METH)ACRYLIC POLYMER 2 | MMA/BMA/2EHMA/X22-174ASX/X22-174DX | 40/20/20/14/6 |
| (METH)ACRYLIC POLYMER 3 | MMA/BMA/2EHMA/X22-174ASX/X22-174DX | 40/20/20/8.7/11.3 |
| (METH)ACRYLIC POLYMER 4 | MMA/BMA/2EHMA/X22-174DX | 40/20/20/20 |
| (METH)ACRYLIC POLYMER 5 | MMA/BMA/2EHMA/X22-174DX | 40/20/20/20 |
| (METH)ACRYLIC POLYMER 6 | DCPMA/BMA/2EHMA/X22-174DX | 40/20/20/20 |
| (METH)ACRYLIC POLYMER 7 | DCPMA/2EHMA/X22-174DX | 40/40/20 |
| (METH)ACRYLIC POLYMER 8 | MMA/BMA/2EHMA/X22-174DX | 45/22.5/22.5/10 |
| (METH)ACRYLIC POLYMER 9 | X22-174DX (HOMOPOLYMER) | 100 |
| (METH)ACRYLIC POLYMER 10 | X22-174ASX (HOMOPOLYMER) | 100 |
| (METH)ACRYLIC POLYMER 11 | MMA/BMA/2EHMA/X22-174ASX | 40/20/20/20 |

TABLE 1-continued

| | | |
|---|---|---|
| NON- (METH)ACRYLIC POLYMER 12 | KF-96-100cs (LINEAR SILICONE) | — |
| NON- (METH)ACRYLIC POLYMER 13 | KF-96H-10⁵CS (LINEAR SILICONE) | — |
| NON- (METH)ACRYLIC POLYMER 14 | X22-174DX (MACROMONOMER) | — |
| NON- (METH)ACRYLIC POLYMER 15 | X22-174ASX (MACROMONOMER) | — |

| No. | FUNCTIONAL GROUP EQUIVALENT | CHAIN TRANSFER AGENT (METHYL THIOGLYCOLATE) PARTS BY MASS | SOLVENT | Mw |
|---|---|---|---|---|
| (METH)ACRYLIC POLYMER 1 | 1460 | 0.51 | TOLUENE | 22800 |
| (METH)ACRYLIC POLYMER 2 | 2010 | 0.51 | TOLUENE | 22400 |
| (METH)ACRYLIC POLYMER 3 | 2990 | 0.51 | TOLUENE | 22500 |
| (METH)ACRYLIC POLYMER 4 | 4600 | 0.51 | TOLUENE | 24100 |
| (METH)ACRYLIC POLYMER 5 | 4600 | 0.45 | TOLUENE | 35600 |
| (METH)ACRYLIC POLYMER 6 | 4600 | 0.51 | TOLUENE | 19000 |
| (METH)ACRYLIC POLYMER 7 | 4600 | 0.51 | TOLUENE | 18200 |
| (METH)ACRYLIC POLYMER 8 | 4600 | 0.53 | TOLUENE | 22200 |
| (METH)ACRYLIC POLYMER 9 | 4600 | 0 | N-HEPTANE | 41000 |
| (METH)ACRYLIC POLYMER 10 | 900 | 0 | TOLUENE | 480000 |
| (METH)ACRYLIC POLYMER 11 | 900 | 0.55 | TOLUENE | 21700 |
| NON- (METH)ACRYLIC POLYMER 12 | — | — | — | 8000 |
| NON- (METH)ACRYLIC POLYMER 13 | — | — | — | 100000 |
| NON- (METH)ACRYLIC POLYMER 14 | 4600 | — | — | — |
| NON- (METH)ACRYLIC POLYMER 15 | 900 | — | — | — |

The abbreviations described in Table 1 are as follows.
 MMA: methyl methacrylate Tg 105° C.
 BMA: BUTYL METHACRYLATE Tg 20° C.
 2EHMA: 2-ethylhexyl methacrylate Tg −10° C.
 X-22-174ASX: methacrylate monomer containing a polyorganosiloxane skeleton and having a functional group equivalent of 900 g/mol, made by Shin-Etsu Chemical Co., Ltd.
 X-22-174DX: methacrylate monomer containing a polyorganosiloxane skeleton and having a functional group equivalent of 4600 g/mol, made by Shin-Etsu Chemical Co., Ltd.
 KF-96-100cs: silicone oil (linear silicone) having a polydimethylsiloxane structure, kinematic viscosity 100 mm²/s (25° C.), made by Shin-Etsu Chemical Co., Ltd.
 KF-96-100,000cs: silicone oil (linear silicone) having a polydimethylsiloxane structure, kinematic viscosity 100,000 mm²/s (25° C.), made by Shin-Etsu Chemical Co., Ltd.

<Measurement of Molecular Weight>

The weight average molecular weight of a polymer was measured by using a GPC apparatus (product name: HLG-8220GPC, made by TOSOH CORP). Measurement conditions were as follows and the molecular weight was determined by standard polystyrene conversion.
 Sample concentration: 0.2 wt % (tetrahydrofuran (THF) solution)
 Sample injection volume: 10 µl
 Eluent: THF
 Flow Rate: 0.6 ml/min
 Measuring temperature: 40° C.
 Column:
  Sample column; TSKguardcolumn SuperHZ-H (one column1)+TSKgel SuperHZM-H (two columns)
  Reference column; TSKgel SuperH-RC (one column)
 Detector: differential refractometer (RI)

Example 1

(Preparation of Pressure-Sensitive Adhesive Composition)

After 5 parts by mass of the aforementioned (meth)acrylic polymer 1 and 0.1 parts by mass of trimethylolpropane triacrylate (TMPTA) as a cross-linking agent were added to 100 parts by mass of the aforementioned acrylic polymer syrup 1, these were mixed uniformly to prepare a pressure-sensitive adhesive composition.

(Production of Pressure-Sensitive Adhesive Layer)

A coated layer having a final thickness of 50 µm was formed by coating the aforementioned pressure-sensitive adhesive composition on one surface of a polyester film having a thickness of 38 µm (product name: Diafoil MRF, made by Mitsubishi Plastics Inc.), the one surface having been subjected to a release treatment with silicone. Subsequently, the surface of the coated pressure-sensitive adhesive composition was covered with one surface of a polyester film having a thickness of 38 µm (product name: Diafoil MRE, made by Mitsubishi Plastics Inc.), the one surface having been subjected to a release treatment with silicone, so that the one surface of the film was located near to the coated layer. Thereby, oxygen was blocked from the coated layer of the pressure-sensitive adhesive composition (pressure-sensitive adhesive composition layer). A pressure-sensitive adhesive layer sheet was obtained by irradiating, for 360 seconds, the coated layer thus obtained with ultraviolet rays having an illuminance of 5 mW/cm² (measured by TOPCONUVR-T1 having a maximum sensitivity at approximately 350 nm) with the use of a chemical light lamp (made by TOSHIBA CORPORATION) in order to polymerize the composition. The polyester films provided on both the surfaces of the pressure-sensitive adhesive layer sheet function as a release liner.

Examples 2 to 20, Comparative Examples 1 to 17

Each of the pressure-sensitive adhesive layer sheets of Examples 2 to 20 and Comparative Examples 1 to 17 was prepared in the same way as that of Example 1 by preparing a pressure-sensitive adhesive composition in the same way as Example 1, except that the polymer (B) and the use amount thereof listed in Table 2 were used based on 100 parts by mass of the polymer (A) listed in Table 1.

TABLE 2

| | POLYMER (A) 100 PARTS BY MASS | POLYMER (B) TYPE | POLYMER (B) PART BY MASS | CROSS-LINKING AGENT (POLYFUNCTIONAL MONOMER) PART BY MASS | GEL FRACTION (%) |
|---|---|---|---|---|---|
| EXAMPLE 1 | 2EHA/NVP = 86/14 | (METH)ACRYLIC POLYMER 1 | 5 | 0.1 | 87.0 |
| EXAMPLE 2 | 2EHA/NVP = 86/14 | (METH)ACRYLIC POLYMER 2 | 3 | 0.08 | 85.1 |
| EXAMPLE 3 | 2EHA/NVP = 86/14 | (METH)ACRYLIC POLYMER 2 | 5 | 0.1 | 87.0 |
| EXAMPLE 4 | 2EHA/NVP = 86/14 | (METH)ACRYLIC POLYMER 2 | 10 | 0.1 | 84.4 |
| EXAMPLE 5 | 2EHA/AA = 94/6 | (METH)ACRYLIC POLYMER 2 | 3 | 0.07 | 73.9 |
| EXAMPLE 6 | 2EHA/AA = 94/6 | (METH)ACRYLIC POLYMER 2 | 5 | 0.09 | 82.5 |
| EXAMPLE 7 | 2EHA/AA = 94/6 | (METH)ACRYLIC POLYMER 2 | 10 | 0.09 | 76.2 |
| EXAMPLE 8 | 2EHA/NVP = 86/14 | (METH)ACRYLIC POLYMER 3 | 3 | 0.08 | 84.6 |
| EXAMPLE 9 | 2EHA/NVP = 86/14 | (METH)ACRYLIC POLYMER 3 | 5 | 0.1 | 86.6 |
| EXAMPLE 10 | 2EHA/NVP = 86/14 | (METH)ACRYLIC POLYMER 3 | 10 | 0.1 | 85.4 |
| EXAMPLE 11 | 2EHA/AA = 94/6 | (METH)ACRYLIC POLYMER 3 | 3 | 0.07 | 76.4 |
| EXAMPLE 12 | 2EHA/AA = 94/6 | (METH)ACRYLIC POLYMER 3 | 5 | 0.09 | 77.5 |
| EXAMPLE 13 | 2EHA/AA = 94/6 | (METH)ACRYLIC POLYMER 3 | 10 | 0.09 | 79.5 |
| EXAMPLE 14 | 2EHA/AA = 94/6 | (METH)ACRYLIC POLYMER 4 | 1 | 0.07 | 77.4 |
| EXAMPLE 15 | 2EHA/AA = 94/6 | (METH)ACRYLIC POLYMER 4 | 3 | 0.08 | 79.6 |
| EXAMPLE 16 | 2EHA/AA = 94/6 | (METH)ACRYLIC POLYMER 4 | 5 | 0.09 | 81.2 |
| EXAMPLE 17 | 2EHA/AA = 94/6 | (METH)ACRYLIC POLYMER 5 | 5 | 0.09 | 81.6 |
| EXAMPLE 18 | 2EHA/AA = 94/6 | (METH)ACRYLIC POLYMER 6 | 5 | 0.1 | 82.1 |
| EXAMPLE 19 | 2EHA/AA = 94/6 | (METH)ACRYLIC POLYMER 7 | 5 | 0.1 | 81.5 |
| EXAMPLE 20 | 2EHA/AA = 94/6 | (METH)ACRYLIC POLYMER 8 | 5 | 0.09 | 78.6 |
| COMPARATIVE EXAMPLE 1 | 2EHA/NVP = 86/14 | — | — | 0.06 | 84.2 |
| COMPARATIVE EXAMPLE 2 | 2EHA/AA = 94/6 | — | — | 0.09 | 83.5 |
| COMPARATIVE EXAMPLE 3 | 2EHA/NVP = 86/14 | NON-(METH)ACRYLIC POLYMER 12 | 5 | 0.1 | 87.9 |
| COMPARATIVE EXAMPLE 4 | 2EHA/NVP = 86/14 | NON-(METH)ACRYLIC POLYMER 12 | 10 | 0.1 | 84.7 |
| COMPARATIVE EXAMPLE 5 | 2EHA/NVP = 86/14 | NON-(METH)ACRYLIC POLYMER 13 | 1 | 0.07 | 83.2 |
| COMPARATIVE EXAMPLE 6 | 2EHA/NVP = 86/14 | NON-(METH)ACRYLIC POLYMER 13 | 5 | 0.1 | 89.3 |
| COMPARATIVE EXAMPLE 7 | 2EHA/NVP = 86/14 | NON-(METH)ACRYLIC POLYMER 14 | 1 | 0.07 | 85.0 |
| COMPARATIVE EXAMPLE 8 | 2EHA/NVP = 86/14 | NON-(METH)ACRYLIC POLYMER 14 | 5 | 0.1 | 88.8 |
| COMPARATIVE EXAMPLE 9 | 2EHA/NVP = 86/14 | NON-(METH)ACRYLIC POLYMER 15 | 5 | 0.1 | 88.6 |
| COMPARATIVE EXAMPLE 10 | 2EHA/NVP = 86/14 | (METH)ACRYLIC POLYMER 9 | 1 | 0.07 | 86.6 |
| COMPARATIVE EXAMPLE 11 | 2EHA/NVP = 86/14 | (METH)ACRYLIC POLYMER 9 | 5 | 0.1 | 89.1 |
| COMPARATIVE EXAMPLE 12 | 2EHA/NVP = 86/14 | (METH)ACRYLIC POLYMER 10 | 1 | 0.07 | 87.9 |
| COMPARATIVE EXAMPLE 13 | 2EHA/NVP = 86/14 | (METH)ACRYLIC POLYMER 10 | 5 | 0.1 | 92.0 |
| COMPARATIVE EXAMPLE 14 | 2EHA/AA = 94/6 | (METH)ACRYLIC POLYMER 10 | 5 | 0.1 | 82.6 |
| COMPARATIVE EXAMPLE 15 | 2EHA/NVP = 86/14 | (METH)ACRYLIC POLYMER 11 | 1 | 0.07 | 85.1 |
| COMPARATIVE EXAMPLE 16 | 2EHA/NVP = 86/14 | (METH)ACRYLIC POLYMER 11 | 5 | 0.1 | 86.9 |
| COMPARATIVE EXAMPLE 17 | 2EHA/AA = 94/6 | (METH)ACRYLIC POLYMER 11 | 5 | 0.09 | 75.6 |

Example 21

(Preparation of Acrylic Polymer 1 as (A) Component by Solution Polymerization)

Five parts by mass of acrylic acid, 95 parts by mass of 2-ethylhexyl acrylate, and 200 parts by mass of ethyl acetate as a polymerization solvent were placed into a 4-neck flask provided with a stirring blade, thermometer, nitrogen gas inlet pipe, and cooler. After they were stirred under a nitrogen atmosphere at 60° C. for 2 hours, 0.2 parts by mass of azobisisobutyronitrile were placed therein as a thermal polymerization initiator to react with them at 60° C. for 6 hours. The weight average molecular weight of the obtained polymer was 1,100,000.

(Preparation of Pressure-Sensitive Adhesive Composition)

A pressure-sensitive adhesive composition (1) was prepared: by adding, to 500 parts by mass of a solution (100 parts by mass of the acrylic polymer (A)) in which the aforementioned acrylic polymer (A) solution (35% by mass) was diluted with ethyl acetate to 20% by mass, 3 parts by mass of the (meth)acrylic polymer 2, 1 part by mass of CORONATE L (an adduct of trimethylolpropane/tolylene diisocyanate trimer, made by NIPPON POLYURETHANE INDUSTRY CO., LTD.) as a cross-linking agent, and 3 parts by mass of an ethyl acetate solution (1% by mass) of dioctyl tin dilaurate as a cross-linking catalyst; and then by mixing and stirring them at 25° C. for approximately 5 minutes.

(Production of Pressure-Sensitive Adhesive Sheet)

A pressure-sensitive adhesive layer having a thickness of 50 μm was formed: by coating the aforementioned pressure-sensitive adhesive composition (1) on one surface of a polyester film having a thickness of 38 μm (product name: Diafoil MRF, made by Mitsubishi Plastics Inc.), the one surface having been subjected to a release treatment with silicone; and then by heating the composition (1) at 130° C. for approximately 2 minutes.

Examples 22, 23, 29 to 32, Comparative Example 18

Each of the pressure-sensitive adhesive layer sheets of Examples 22, 23, 29 to 32 and Comparative Example 18 was prepared in the same way as that of Example 21 by preparing a pressure-sensitive adhesive composition in the same way as Example 21, except that the polymer (B) and the use amount thereof listed in Table 3 were used based on 100 parts by mass of the polymer (A) listed in Table 1. In Example 29, 20 parts by mass of a tackifying resin with the product name of "SUMILITE RESIN PR-12603N" (made by SUMITOMO BAKELITE CO., LTD.) were used. In Example 30, 20 parts by mass of a tackifying resin with the product name of "PENSEL D-125" (made by ARAKAWA CHEMICAL INDUSTRIES, LTD.) were used. In Example 31, 20 parts by mass of a tackifying resin with the product name of "TAMANOL 803L" (made by ARAKAWA CHEMICAL INDUSTRIES, LTD.) were used. In Example 32, 20 parts by mass of a tackifying resin with the product name of "YS Polystar N125" (made by YASUHARA CHEMICAL CO., LTD.) were used.

Examples 24 to 28, Comparative Example 19

(Preparation of Acrylic Polymer 2 as (A) Component by Solution Polymerization)

Five parts by mass of acrylic acid, 100 parts by mass of n-butyl acrylate, and 200 parts by mass of toluene as a polymerization solvent were placed into a 4-neck flask provided with a stirring blade, thermometer, nitrogen gas inlet pipe, and cooler. After they were stirred under a nitrogen atmosphere at 60° C. for 2 hours, 0.2 parts by mass of azobisisobutyronitrile were placed therein as a thermal polymerization initiator to react with them at 60° C. for 6 hours. The weight average molecular weight of the obtained polymer was 400,000. The pressure-sensitive adhesive composition (1) was prepared by using the acrylic polymer 2 in the same way as the aforementioned Example 21, and then a pressure-sensitive adhesive sheet was produced.

TABLE 3

| | POLYMER (A) 100 PARTS BY MASS | POLYMER (B) TYPE | POLYMER (B) PARTS BY MASS | CROSS-LINKING AGENT (CORONATE L) PARTS BY MASS | GEL FRACTION (%) |
|---|---|---|---|---|---|
| EXAMPLE 21 | 2EHA/AA = 95/5 | (METH)ACRYLIC POLYMER 2 | 3 | 1 | 47.0 |
| EXAMPLE 22 | 2EHA/AA = 95/5 | (METH)ACRYLIC POLYMER 2 | 5 | 1 | 47.7 |
| EXAMPLE 23 | 2EHA/AA = 95/5 | (METH)ACRYLIC POLYMER 3 | 3 | 1 | 45.0 |
| EXAMPLE 24 | BA/AA = 100/5 | (METH)ACRYLIC POLYMER 2 | 3 | 1 | 32.8 |
| EXAMPLE 25 | BA/AA = 100/5 | (METH)ACRYLIC POLYMER 3 | 3 | 1 | 33.8 |
| EXAMPLE 26 | BA/AA = 100/5 | (METH)ACRYLIC POLYMER 3 | 5 | 1 | 33.7 |
| EXAMPLE 27 | BA/AA = 100/5 | (METH)ACRYLIC POLYMER 4 | 1 | 1 | 34.4 |
| EXAMPLE 28 | BA/AA = 100/5 | (METH)ACRYLIC POLYMER 4 | 3 | 1 | 33.5 |
| EXAMPLE 29 | 2EHA/AA = 95/5 | (METH)ACRYLIC POLYMER 3 | 5 | 1 | 32.1 |
| EXAMPLE 30 | 2EHA/AA = 95/5 | (METH)ACRYLIC POLYMER 3 | 5 | 3 | 39.1 |
| EXAMPLE 31 | 2EHA/AA = 95/5 | (METH)ACRYLIC POLYMER 3 | 5 | 1 | 27.0 |
| EXAMPLE 32 | 2EHA/AA = 95/5 | (METH)ACRYLIC POLYMER 3 | 5 | 1 | 27.3 |
| COMPARATIVE EXAMPLE 18 | 2EHA/AA = 95/5 | — | — | 1 | 51.1 |
| COMPARATIVE EXAMPLE 19 | BA/AA = 100/5 | — | — | 1 | 32.9 |

(Measurement of Ratio of Solvent-Insoluble Component)

A ratio of a solvent-insoluble component (gel fraction) was calculated in the following way: after 0.1 g of a pressure-sensitive adhesive composition was sampled and precisely weighed (mass before dipping), the sampled composition was dipped in approximately 50 ml of ethyl acetate at room temperature (20 to 25° C.) for 1 week; a solvent (ethyl acetate) insoluble component was taken out to be dried at 130° C. for 2 hours and then weighed (mass after dipping and drying); and the ratio was calculated by using an equation for calculating a "ratio of solvent-insoluble component (% by mass)=[(mass after dipping and drying)/(mass before dipping)]×100". The results of measuring the ratios of solvent-insoluble components are shown in Tables 2 and 3.

(Test Method)

[180°-Peeling Pressure-Sensitive Adhesive Force Test]

After the release liner (polyester film) on one surface of the acrylic pressure-sensitive adhesive layer sheet according to each of Examples and Comparative Examples was peeled, a polyethylene terephthalate film having a thickness of 50 μm was attached. The obtained sheet was cut into a piece having a width of 25 mm, which was used as a test specimen. A glass plate having a thickness of 1.2 mm (made by Matsunami Glass Ind., Ltd.), which had been cleaned with isopropyl alcohol, an ABS plate, and a stainless plate (430BA), which had been cleaned with toluene, were provided. After the release liner (polyester film) on the other surface of the pressure-sensitive adhesive layer sheet was peeled, the pressure-sensitive adhesive surface of the sheet was attached to the stainless plate (430BA plate), the ABS plate, and a glass plate, respectively, by reciprocating a 2-kg roller.

After the pressure-sensitive adhesive layer sheets were attached to the stainless plate (430BA plates), the ABS plate, and the glass plate, respectively, the plates were left under an environment of 23° C. for 30 minutes (initial condition).

Additionally, after the pressure-sensitive adhesive layer sheets were attached to the stainless plate (430BA plate), the ABS plate, and the glass plate, respectively, and then after 48 hours elapsed under an environment of 40° C., the plates were left under an environment of 23° C. for 30 minutes (ordinary condition). The other end of each of the pressure-sensitive adhesive layer sheets in each of the initial condition and the ordinary condition was peeled in the 180°-peeling direction at a speed of 300 mm/min. The pressure-sensitive adhesive force (resistance force) (unit: N/25 mm) to the adherend, occurring at the time, was measured. With respect to all the three adherends, the case was determined to be good (°) where the pressure-sensitive adhesive force in the initial condition was smaller than 7.0 and the pressure-sensitive adhesive force in the ordinary condition was two times or more larger than that in the initial condition; and the case was determined to be bad (X) where the force in the initial condition was 7.0 or more and the force in the ordinary condition was less than two times the force in the initial condition. Results of measuring the 180°-peeling pressure-sensitive adhesive force are shown in Tables 4 and 5.

[Contamination Property]

After the release liner (polyester film) on one surface of the pressure-sensitive adhesive layer sheet according to each of Examples and Comparative Examples was peeled, a polyethylene terephthalate film having a thickness of 50 μm was attached. The obtained sheet was cut into apiece having a width of 25 mm, which was used as a test specimen. A stainless plate (430BA) having a thickness of 0.42 mm, which had been cleaned with toluene, was provided. After the release liner (polyester film) on the other surface of the pressure-sensitive adhesive layer sheet was peeled, the pressure-sensitive adhesive surface of the sheet was attached to the stainless plate (430BA plate) by reciprocating a 2-kg roller. Then, the attached sheet was left under an atmosphere of 23° C. and a relative humidity of 50% for 30 minutes, and the external appearance of the adherend was observed after the pressure-sensitive adhesive layer sheet was peeled in the 180° direction at a speed of 300 mm/min. The case was evaluated to be good (°) where contamination was not confirmed at all, while the case was evaluated to be bad (X) where contamination was confirmed. Results of evaluating contamination properties are shown in Tables 4 and 5.

TABLE 4

| | PRESSURE-SENSITIVE ADHESIVE FORCE TO SUS (430BA) (N/25 mm) | | PRESSURE-SENSITIVE ADHESIVE FORCE TO ABS (N/25 mm) | | PRESSURE-SENSITIVE ADHESIVE FORCE TO GLASS (N/25 mm) | | CONTAMINATION PROPERTY | REWORK + INCREASING PROPERTY OVER TIME |
|---|---|---|---|---|---|---|---|---|
| | INITIAL | AFTER TWO DAYS AT 40° C. | INITIAL | AFTER TWO DAYS AT 40° C. | INITIAL | AFTER TWO DAYS AT 40° C. | | |
| EXAMPLE 1 | 3.9 | 10.8 | 5.0 | 12.8 | 3.5 | 11.3 | ○ | ○ |
| EXAMPLE 2 | 4.5 | 11.5 | 3.7 | 10.8 | 3.9 | 10.7 | ○ | ○ |
| EXAMPLE 3 | 2.6 | 10.3 | 3.7 | 11.3 | 2.8 | 10.2 | ○ | ○ |
| EXAMPLE 4 | 3.0 | 11.7 | 3.2 | 11.8 | 1.7 | 11.5 | ○ | ○ |
| EXAMPLE 5 | 2.9 | 16.5 | 2.7 | 16.3 | 4.5 | 17.7 | ○ | ○ |
| EXAMPLE 6 | 0.7 | 12.0 | 0.7 | 16.5 | 3.8 | 18.0 | ○ | ○ |
| EXAMPLE 7 | 0.3 | 12.0 | 0.3 | 13.7 | 0.9 | 16.9 | ○ | ○ |
| EXAMPLE 8 | 4.2 | 10.1 | 3.4 | 10.0 | 3.1 | 9.0 | ○ | ○ |
| EXAMPLE 9 | 3.0 | 8.9 | 1.6 | 10.0 | 1.8 | 8.2 | ○ | ○ |
| EXAMPLE 10 | 1.8 | 10.2 | 1.6 | 10.0 | 1.3 | 9.5 | ○ | ○ |
| EXAMPLE 11 | 1.7 | 10.9 | 1.3 | 14.9 | 3.1 | 16.2 | ○ | ○ |
| EXAMPLE 12 | 0.3 | 8.3 | 0.4 | 11.8 | 2.3 | 14.4 | ○ | ○ |
| EXAMPLE 13 | 0.3 | 9.3 | 0.3 | 10.8 | 0.5 | 14.6 | ○ | ○ |
| EXAMPLE 14 | 2.7 | 6.6 | 3.4 | 12.7 | 2.8 | 11.0 | ○ | ○ |
| EXAMPLE 15 | 0.9 | 5.6 | 2.2 | 7.0 | 1.9 | 8.5 | ○ | ○ |
| EXAMPLE 16 | 1.5 | 6.4 | 1.1 | 7.0 | 1.4 | 7.5 | ○ | ○ |
| EXAMPLE 17 | 1.2 | 5.7 | 0.7 | 8.2 | 2.5 | 7.4 | ○ | ○ |
| EXAMPLE 18 | 1.0 | 5.7 | 0.7 | 6.3 | 0.8 | 4.3 | ○ | ○ |
| EXAMPLE 19 | 1.4 | 7.3 | 1.1 | 8.3 | 0.9 | 6.1 | ○ | ○ |
| EXAMPLE 20 | 2.4 | 8.8 | 3.4 | 14.1 | 3.8 | 11.8 | ○ | ○ |
| COMPARATIVE EXAMPLE 1 | 11.0 | 10.9 | 9.8 | 12.5 | 9.1 | 11.4 | ○ | x |
| COMPARATIVE EXAMPLE 2 | 12.4 | 16.7 | 12.3 | 14.8 | 14.4 | 15.2 | ○ | x |
| COMPARATIVE EXAMPLE 3 | 5.2 | 9.7 | 5.9 | 10.2 | 4.7 | 8.5 | x | x |
| COMPARATIVE EXAMPLE 4 | 5.3 | 8.6 | 5.6 | 9.5 | 4.4 | 6.5 | x | x |
| COMPARATIVE EXAMPLE 5 | 8.3 | 10.5 | 8.6 | 13.3 | 9.0 | 11.5 | x | x |
| COMPARATIVE EXAMPLE 6 | 5.2 | 4.2 | 5.1 | 8.8 | 4.6 | 4.3 | x | x |
| COMPARATIVE EXAMPLE 7 | 9.3 | 11.0 | 8.2 | 11.8 | 4.9 | 9.7 | ○ | x |
| COMPARATIVE EXAMPLE 8 | 6.7 | 8.9 | 6.1 | 10.3 | 2.4 | 6.1 | x | x |
| COMPARATIVE EXAMPLE 9 | 9.5 | 10.4 | 8.9 | 12.0 | 7.6 | 9.9 | x | x |
| COMPARATIVE EXAMPLE 10 | 5.8 | 9.0 | 4.7 | 10.6 | 3.1 | 7.9 | x | x |
| COMPARATIVE EXAMPLE 11 | 0.7 | 1.7 | 1.0 | 1.0 | 0.4 | 0.8 | x | x |

TABLE 4-continued

|  | PRESSURE-SENSITIVE ADHESIVE FORCE TO SUS (430BA) (N/25 mm) | | PRESSURE-SENSITIVE ADHESIVE FORCE TO ABS (N/25 mm) | | PRESSURE-SENSITIVE ADHESIVE FORCE TO GLASS (N/25 mm) | | CONTAMINATION PROPERTY | REWORK + INCREASING PROPERTY OVER TIME |
|---|---|---|---|---|---|---|---|---|
|  | INITIAL | AFTER TWO DAYS AT 40° C. | INITIAL | AFTER TWO DAYS AT 40° C. | INITIAL | AFTER TWO DAYS AT 40° C. |  |  |
| COMPARATIVE EXAMPLE 12 | 9.6 | 11.3 | 8.9 | 12.0 | 7.5 | 9.7 | ○ | x |
| COMPARATIVE EXAMPLE 13 | 7.0 | 9.4 | 6.1 | 9.3 | 3.6 | 5.2 | x | x |
| COMPARATIVE EXAMPLE 14 | 4.5 | 8.3 | 4.5 | 12.7 | 6.7 | 9.1 | x | x |
| COMPARATIVE EXAMPLE 15 | 9.6 | 12.1 | 10.2 | 14.6 | 11.2 | 13.2 | ○ | x |
| COMPARATIVE EXAMPLE 16 | 8.0 | 10.2 | 8.6 | 16.0 | 9.1 | 10.7 | ○ | x |
| COMPARATIVE EXAMPLE 17 | 9.5 | 15.9 | 11.8 | 19.1 | 15.1 | 23.2 | ○ | x |

TABLE 5

|  | PRESSURE-SENSITIVE ADHESIVE FORCE TO SUS (430BA) (N/25 mm) | | PRESSURE-SENSITIVE ADHESIVE FORCE TO ABS (N/25 mm) | | PRESSURE-SENSITIVE ADHESIVE FORCE TO GLASS (N/25 mm) | | CONTAMINATION PROPERTY | REWORK + INCREASING PROPERTY OVER TIME |
|---|---|---|---|---|---|---|---|---|
|  | INITIAL | AFTER TWO DAYS AT 40° C. | INITIAL | AFTER TWO DAYS AT 40° C. | INITIAL | AFTER TWO DAYS AT 40° C. |  |  |
| EXAMPLE 21 | 0.17 | 8.2 | 0.41 | 9.9 | 0.80 | 7.5 | ○ | ○ |
| EXAMPLE 22 | 0.12 | 8.2 | 0.13 | 10.0 | 0.28 | 7.2 | ○ | ○ |
| EXAMPLE 23 | 0.14 | 5.1 | 0.28 | 7.9 | 0.37 | 5.7 | ○ | ○ |
| EXAMPLE 24 | 0.89 | 7.6 | 0.98 | 9.9 | 2.50 | 9.2 | ○ | ○ |
| EXAMPLE 25 | 0.72 | 8.2 | 0.76 | 10.1 | 4.80 | 10.6 | ○ | ○ |
| EXAMPLE 26 | 0.12 | 5.5 | 0.14 | 7.0 | 0.32 | 5.8 | ○ | ○ |
| EXAMPLE 27 | 0.84 | 8.6 | 1.52 | 10.1 | 4.30 | 10.4 | ○ | ○ |
| EXAMPLE 28 | 0.26 | 7.9 | 0.23 | 9.4 | 2.40 | 4.9 | ○ | ○ |
| EXAMPLE 29 | 0.16 | 2.6 | 0.15 | 4.9 | 0.30 | 5.3 | ○ | ○ |
| EXAMPLE 30 | 0.35 | 5.0 | 2.90 | 8.2 | 1.40 | 5.0 | ○ | ○ |
| EXAMPLE 31 | 0.14 | 4.6 | 1.35 | 7.2 | 0.20 | 5.5 | ○ | ○ |
| EXAMPLE 32 | 0.38 | 4.5 | 1.80 | 6.6 | 0.45 | 4.8 | ○ | ○ |
| COMPARATIVE EXAMPLE 18 | 10.10 | 9.7 | 10.10 | 12.4 | 8.40 | 10.1 | ○ | x |
| COMPARATIVE EXAMPLE 19 | 9.00 | 10.0 | 9.80 | 13.5 | 9.30 | 11.8 | ○ | x |

The present invention should not be limited to the aforementioned embodiments, and various modifications, such as design modifications, can be made with respect to the above embodiments based on the knowledge of those skilled in the art, and an embodiment with such a modification can fall within the scope of the invention.

For example, matters disclosed by this description include the following:

(1) A pressure-sensitive adhesive composition comprising:
an acrylic polymer (A) having a glass transition temperature lower than 0 C.°; and
a polymer (B) containing, as monomer units, both a monomer (B1) having a polyorganosiloxane skeleton and a monomer (B2) whose homopolymer has a glass transition temperature of 40 C.° or higher;
wherein the acrylic polymer (A) contains, as a monomer unit, at least one monomer selected from the group consisting of N-vinyl cyclic amides represented by the following general formula (M1):

(M1)

wherein $R^1$ is a divalent organic group.

(2) The pressure-sensitive adhesive composition according to (1) above, wherein a content of the monomer selected from the group consisting of N-vinyl cyclic amides is 0.01% by mass to 40% by mass, based on the total monomer components of the polymer (A).

(3) The pressure-sensitive adhesive composition according to (1) or (2) above, wherein a content of the monomer (B1) is 5% by mass or more but 50% by mass or less, based on the total monomer components of the polymer (B).

(4) The pressure-sensitive adhesive composition according to any of (1) to (3) above, wherein
the monomer (B2) comprises a monomer whose homopolymer has a glass transition temperature of 80 C.° or higher, and a content of the monomer whose homopolymer has a glass transition temperature of 80 C.° or higher is 10% by mass or more but 80% by mass or less, based on the total monomer components of the polymer (B).

(5) The pressure-sensitive adhesive composition according to any of (1) to (4) above, wherein the total monomer components of the polymer (B) comprise:
15% by mass or more but 30% by mass or less of the monomer (B1), and
10% by mass or more but 80% by mass or less of a monomer whose homopolymer has a glass transition temperature of 80 C.° or higher, as the monomer (B2).

(6) The pressure-sensitive adhesive composition according to any of (1) to (5) above, wherein the monomer (B2) comprises both a monomer whose homopolymer has a glass transition temperature of 80 C.° or higher and a monomer whose homopolymer has a glass transition temperature of 40 C.° or higher but lower than 80 C.°.

(7) The pressure-sensitive adhesive composition according to any of (1) to (6) above, wherein the monomer having a polyorganosiloxane skeleton is one or more monomers selected from the group consisting of monomers represented by the following general formula (1) or (2):

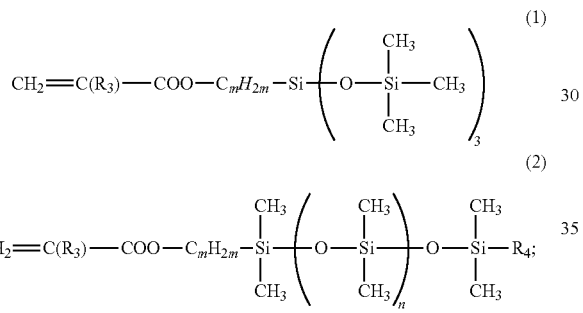

wherein, $R_3$ is hydrogen or methyl; $R_4$ is methyl or a monovalent organic group; and each of m and n is an integer of 0 or more.

(8) The pressure-sensitive adhesive composition according to any of (1) to (7) above, further comprising a polymerization initiator.

(9) A pressure-sensitive adhesive sheet comprising a pressure-sensitive adhesive layer made of a pressure-sensitive adhesive composition, wherein
the pressure-sensitive adhesive composition includes:
an acrylic polymer (A) having a glass transition temperature lower than 0 C.°; and
a polymer (B) containing, as monomer units, both a monomer (B1) having a polyorganosiloxane skeleton and a monomer (B2) whose homopolymer has a glass transition temperature of 40 C.° or higher;
wherein the acrylic polymer (A) contains, as a monomer unit, at least one monomer selected from the group consisting of N-vinyl cyclic amides represented by the following general formula (M1):

wherein $R^1$ is a divalent organic group.

(10) The pressure-sensitive adhesive sheet according to (9) above, wherein the pressure-sensitive adhesive sheet is provided on at least one surface of a supporting body.

(11) The pressure-sensitive adhesive sheet according to (9) or (10) above,
wherein pressure-sensitive adhesive force to each of a stainless plate, an ABS plate, and a glass plate, occurring in an initial condition of 23° C. for 30 minutes, is smaller than 3.0 N/25 mm, and wherein
pressure-sensitive adhesive force to each of the plates, occurring in an ordinary condition of 48 hours at 40° C., followed by 23° C. for 30 minutes, is 5.7 times or more larger than the pressure-sensitive adhesive force occurring in the initial condition.

(12) A pressure-sensitive adhesive composition comprising:
an acrylic polymer (A) having a glass transition temperature lower than 0 C.°; and
a polymer (B) containing, as monomer units, both a monomer (B1) having a polyorganosiloxane skeleton and a monomer (B2) whose homopolymer has a glass transition temperature of 40 C.° or higher;
wherein the acrylic polymer (A) contains, as a monomer unit, at least one monomer selected from the group consisting of N-vinyl cyclic amides represented by the following general formula (M1):

wherein $R^1$ is a divalent organic group;
wherein a content of the monomer selected from the group consisting of N-vinyl cyclic amides is 0.01% by mass to 40% by mass, based on the total monomer components of the polymer (A),
the total monomer components of the polymer (B) comprise:
15% by mass or more but 30% by mass or less of the monomer (B1), and
10% by mass or more but 80% by mass or less of a (meth)acrylic monomer whose homopolymer has a glass transition temperature of 80 C.° or higher, as the monomer (B2),
the monomer (B2) comprises both a (meth)acrylic monomer whose homopolymer has a glass transition temperature of 80 C.° or higher and a (meth)acrylic monomer whose homopolymer has a glass transition temperature of 40 C.° or higher but lower than 80 C.°.

(13) The pressure-sensitive adhesive sheet comprising a pressure-sensitive adhesive layer formed from the pressure-sensitive adhesive composition according to any of (1) to (8) and (12).

(14) The pressure-sensitive adhesive composition comprising:
a polymer (A) having a glass transition temperature lower than 0 C.°; and
a polymer (B) containing, as monomer units, both a monomer (B1) having a polyorganosiloxane skeleton.

(15) The pressure-sensitive adhesive composition according to (14) above, wherein the monomer having a polyorganosiloxane skeleton is one or more monomers selected from the group consisting of monomers represented by the following general formula (1) or (2):

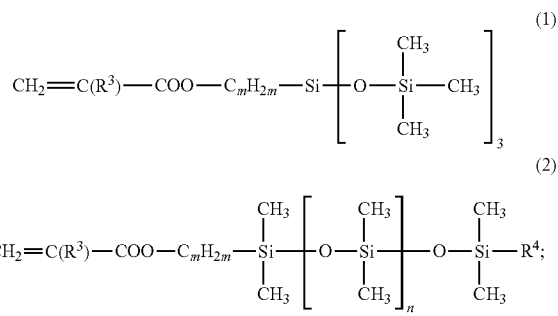

wherein, $R_3$ is hydrogen or methyl; $R_4$ is methyl or a monovalent organic group; and each of m and n is an integer of 0 or more.

(16) The pressure-sensitive adhesive composition according to (14) or (15) above, wherein the content of the monomer having a polyorganosiloxane skeleton is 5% by mass or more and 50% by mass or less, based on the mass of the total monomer components of the polymer (B).

(17) The pressure-sensitive adhesive composition according to any of (14) to (16) above, wherein the monomer components for preparing the polymer (B) contains the monomer having a polyorganosiloxane skeleton and a monomer whose homopolymer has a glass transition temperature of 40 C.° or higher.

(18) The pressure-sensitive adhesive composition according to (17) above, wherein the monomer components for preparing the polymer (B) contains, as the monomer whose homopolymer has a glass transition temperature of 40 C.° or higher, a monomer whose homopolymer has a glass transition temperature of 80 C.° or higher, and a monomer whose homopolymer has a glass transition temperature of 40 C.° or higher and lower than 80 C.° in combination.

(19) The pressure-sensitive adhesive composition according to any of (14) to (18) above, wherein the monomer components for preparing the polymer (B) contains the monomer having a polyorganosiloxane skeleton and a (meth)acrylic monomer.

(20) The pressure-sensitive adhesive composition according to (19) above, wherein a (meth)acrylic monomer contains a (meth)acrylic monomer whose homopolymer has a glass transition temperature of 40 C.° or higher.

(21) The pressure-sensitive adhesive composition according to (19) above, wherein a (meth)acrylic monomer contains a (meth)acrylic monomer whose homopolymer has a glass transition temperature of 80 C.° or higher.

(22) The pressure-sensitive adhesive composition according to (21) above, wherein the content of the (meth)acrylic monomer whose homopolymer has a glass transition temperature of 80 C.° or higher is 30% by mass or more and 50 mass % or less, based on the mass of the total monomer components of the polymer (B).

(23) The pressure-sensitive adhesive composition according to (21) or (22) above, wherein the (meth)acrylic monomer further contains a (meth)acrylic monomer whose homopolymer has a glass transition temperature of lower than 80 C.°.

(24) The pressure-sensitive adhesive composition according to any of (14) to (23) above, wherein the polymer (A) is an acrylic polymer.

(25) The pressure-sensitive adhesive composition according to (24) above, wherein the acrylic polymer contains, as monomer units, both a monomer selected from the group consisting of the N-vinyl cyclic amides and a monomer selected from hydroxyl group-containing monomers.

(26) The pressure-sensitive adhesive composition according to any of (14) to (25) above, wherein the content of the polymer (B) is 0.1 to 20 parts by mass, based on 100 parts by mass of the polymer (A).

(27) The pressure-sensitive adhesive sheet comprising a pressure-sensitive adhesive layer formed from the pressure-sensitive adhesive composition according to any of (14) to (26) above.

(28) The pressure-sensitive adhesive sheet according to (13) or (27) above, wherein
pressure-sensitive adhesive force to each of a stainless plate, an ABS plate, and a glass plate, occurring in an initial condition of 23° C. for 30 minutes, is smaller than 3.0 N/25 mm, and wherein
pressure-sensitive adhesive force to each of the plates, occurring in an ordinary condition of 48 hours at 40° C., followed by 23° C. for 30 minutes, is 5.7 times or more larger than the pressure-sensitive adhesive force occurring in the initial condition.

The present invention can be used, for example, in metal adherends and adherends on which a metal film is formed.

What is claimed is:
1. A pressure-sensitive adhesive composition comprising:
an acrylic polymer (A) having a glass transition temperature lower than 0°; and
a polymer (B) containing, as monomer units, a monomer (B1) having a polyorganosiloxane skeleton and a monomer (B2) comprising both a monomer whose homopolymer has a glass transition temperature of 80° C. or higher and a monomer whose homopolymer has a glass transition temperature of 40° C. or higher but lower than 80° C.;
wherein the acrylic polymer (A) contains, as a monomer unit, at least one monomer selected from the group consisting of N-vinyl cyclic amides represented by the following general formula (M1):

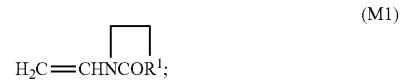

wherein $R^1$ is a divalent organic group.

2. The pressure-sensitive adhesive composition according to claim 1, wherein a content of the monomer selected from the group consisting of N-vinyl cyclic amides is 0.01% by mass to 40% by mass, based on the total monomer components of the polymer (A).

3. The pressure-sensitive adhesive composition according to claim 1, wherein a content of the monomer (B1) is 5% by mass or more but 50% by mass or less, based on the total monomer components of the polymer (B).

4. The pressure-sensitive adhesive composition according to claim 1, wherein
a content of the monomer whose homopolymer has a glass transition temperature of 80° C. or higher is 10% by mass or more but 80% by mass or less, based on the total monomer components of the polymer (B).

5. The pressure-sensitive adhesive composition according to claim 1, wherein the total monomer components of the polymer (B) comprises:
15% by mass or more but 30% by mass or less of the monomer (B1), and 10% by mass or more but 80% by mass or less of the monomer whose homopolymer has a glass transition temperature of 80° C. or higher.

6. The pressure-sensitive adhesive composition according to claim 1, wherein the monomer having a polyorganosiloxane skeleton is one or more monomers selected from the group consisting of monomers represented by the following general formula (1) or (2):

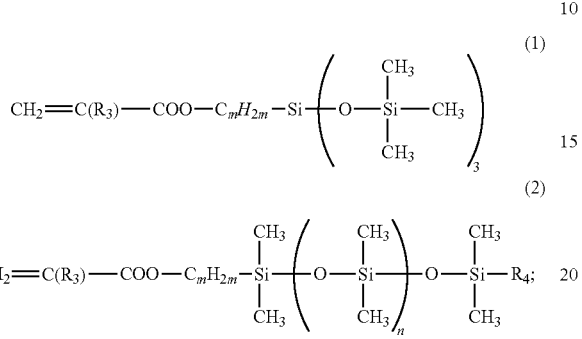

wherein, $R_3$ is hydrogen or methyl; $R_4$ is methyl or a monovalent organic group; and each of m and n is an integer of 0 or more.

7. The pressure-sensitive adhesive composition according to claim 1, further comprising a polymerization initiator.

8. A pressure-sensitive adhesive sheet comprising a pressure-sensitive adhesive layer made of a pressure-sensitive adhesive composition, wherein the pressure-sensitive adhesive composition includes:
an acrylic polymer (A) having a glass transition temperature lower than 0° C.; and
a polymer (B) containing, as monomer units, both a monomer (B1) having a polyorganosiloxane skeleton and a monomer (B2) whose homopolymer has a glass transition temperature of 40° C. or higher;
wherein the acrylic polymer (A) contains, as a monomer unit, at least one monomer selected from the group consisting of N-vinyl cyclic amides represented by the following general formula (M1);

wherein $R^1$ is a divalent organic group,
wherein pressure-sensitive adhesive force to each of a stainless plate, an ABS plate, and a glass plate, occurring in an initial condition of 23° C. for 30 minutes, is smaller than 3.0 N/25 mm, and
wherein pressure-sensitive adhesive force to each of the plates, occurring in an ordinary condition of 48 hours at 40° C., followed by 23° C. for 30 minutes, is 5.7 times or more larger than the pressure-sensitive adhesive force occurring in the initial condition.

9. The pressure-sensitive adhesive sheet according to claim 8, wherein the pressure-sensitive adhesive sheet is provided on at least one surface of a supporting body.

10. A pressure-sensitive adhesive composition comprising:
an acrylic polymer (A) having a glass transition temperature lower than 0° C.; and
a polymer (B) containing, as monomer units, both a monomer (B1) having a polyorganosiloxane skeleton and a monomer (B2) whose homopolymer has a glass transition temperature of 40° C. or higher;
wherein the acrylic polymer (A) contains, as a monomer unit, at least one monomer selected from the group consisting of N-vinyl cyclic amides represented by the following general formula (M1):

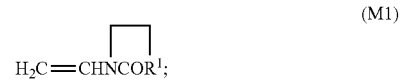

wherein $R^1$ is a divalent organic group;
wherein a content of the monomer selected from the group consisting of N-vinyl cyclic amides is 0.01% by mass to 40% by mass, based on the total monomer components of the polymer (A),
the total monomer components of the polymer (B) comprise:
15% by mass or more but 30% by mass or less of the monomer (B1), and
10% by mass or more but 80% by mass or less of a (meth)acrylic monomer whose homopolymer has a glass transition temperature of 80° C. or higher, as the monomer (B2),
the monomer (B2) comprises both a (meth)acrylic monomer whose homopolymer has a glass transition temperature of 80° C. or higher and a (meth)acrylic monomer whose homopolymer has a glass transition temperature of 40° C. or higher but lower than 80° C.

* * * * *